United States Patent
Ma et al.

(10) Patent No.: US 12,273,776 B2
(45) Date of Patent: Apr. 8, 2025

(54) MASTER NODE, SECONDARY NODE AND USER EQUIPMENT IN MOBILE COMMUNICATION NETWORK AND COMMUNICATION METHODS THEREBETWEEN

(71) Applicant: Samsung Electronics Co., Ltd., Gyeonggi-do (KR)

(72) Inventors: Xiaoning Ma, Beijing (CN); Hong Wang, Beijing (CN); Lixiang Xu, Beijing (CN); Weiwei Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 351 days.

(21) Appl. No.: 17/764,630

(22) PCT Filed: Sep. 29, 2020

(86) PCT No.: PCT/KR2020/013325
§ 371 (c)(1),
(2) Date: Mar. 29, 2022

(87) PCT Pub. No.: WO2021/066515
PCT Pub. Date: Apr. 8, 2021

(65) Prior Publication Data
US 2022/0345951 A1    Oct. 27, 2022

(30) Foreign Application Priority Data

| Sep. 30, 2019 | (CN) | 201910939872.7 |
| Oct. 31, 2019 | (CN) | 201911052447.2 |
| Nov. 6, 2019 | (CN) | 201911076335.0 |

(51) Int. Cl.
*H04W 36/00* (2009.01)
*H04W 36/30* (2009.01)
(Continued)

(52) U.S. Cl.
CPC ... *H04W 36/0058* (2018.08); *H04W 36/0061* (2013.01); *H04W 36/0069* (2018.08);
(Continued)

(58) Field of Classification Search
CPC ......... H04W 36/0058; H04W 36/0061; H04W 36/0069; H04W 36/305; H04W 76/11; H04W 76/18; H04W 76/34; H04W 76/15
See application file for complete search history.

(56) References Cited

U.S. PATENT DOCUMENTS

| 2016/0044744 A1 | 2/2016 | Lee et al. |
| 2020/0059833 A1* | 2/2020 | Yilmaz ................. H04W 36/32 |

(Continued)

FOREIGN PATENT DOCUMENTS

| CN | 106332114 | 1/2017 |
| CN | 107690162 | 2/2018 |

(Continued)

OTHER PUBLICATIONS

Yilmaz, Osman NC, Oumer Teyeb, and Antonino Orsino. "Overview of LTE-NR dual connectivity." IEEE Communications Magazine 57.6 (2019): 138-144. (Year: 2019).*

(Continued)

*Primary Examiner* — Sharad Rampuria
(74) *Attorney, Agent, or Firm* — The Farrell Law Firm, P.C.

(57) ABSTRACT

The present disclosure discloses a master node, a secondary node and a user equipment in a mobile communication network and communication methods thereof. According to an implementation, a method performed by a master node (MN) in a mobile communication network, comprises with receiving from a user equipment (UE), a first message including information reporting a failure of a secondary cell group (SCG) in case that a secondary node change from the (Continued)

source secondary node to a first target secondary node is failed and transmitting, to the source secondary node, a second message including information associated with a failure of the secondary node change, wherein the second message includes at least one of following information, an identifier of the first target secondary node where the failure of the secondary node change occurs, an identifier of the source secondary node to which the UE successfully connects before the failure of the secondary node change, and information on a type of the failure of the secondary node change.

14 Claims, 10 Drawing Sheets

(51) Int. Cl.
  *H04W 76/11* (2018.01)
  *H04W 76/18* (2018.01)
  *H04W 76/34* (2018.01)
(52) U.S. Cl.
  CPC .......... *H04W 36/305* (2018.08); *H04W 76/11* (2018.02); *H04W 76/18* (2018.02); *H04W 76/34* (2018.02)

(56) References Cited

U.S. PATENT DOCUMENTS

| | | | | |
|---|---|---|---|---|
| 2020/0389823 | A1* | 12/2020 | Xu | H04W 76/15 |
| 2022/0053392 | A1* | 2/2022 | Wang | H04W 12/037 |
| 2022/0167233 | A1* | 5/2022 | Shi | H04W 36/0058 |
| 2022/0279617 | A1* | 9/2022 | Orsino | H04W 76/15 |

FOREIGN PATENT DOCUMENTS

| | | |
|---|---|---|
| CN | 110022588 | 7/2019 |
| WO | WO 2014/206489 | 12/2014 |
| WO | WO 2019/074429 | 4/2019 |

OTHER PUBLICATIONS

PCT/ISA/210 Search Report issued on PCT/KR2020/013325, Dec. 30, 2020, pp. 4.
PCT/ISA/237 Written Opinion issued on PCT/KR2020/013325, Dec. 30, 2020, pp. 4.
Nokia, Nokia Shanghai Bell, 3GPP TSG-RAN WG3 Meeting #104 R3-192765 Reno, US, May 3, 2019, "SN change Failure", pp. 4.
ZTE, 3GPP TSG RAN WG3 NR#105 R3-193877 Ljubljana, Slovenia, Aug. 16, 2019, "Detection solution for SN change failure", pp. 7.
3GPP TS 37.340 V15.7.0 (Sep. 2019) Technical Specification 3rd Generation Partnership Project; Technical Specification Group Radio Access Network; Evolved Universal Terrestrial Radio Access (E-UTRA) and NR; Multi-connectivity; Stage 2 (Release 15), Sep. 28, 2019, pp. 72.
ZTE, 3GPP TSG-RAN WG3 Meeting #105 R3-193878 Ljubljana, Slovenia, Aug. 16, 2019, "Stage2 CR for Detection solution for SN change failure", pp. 4.
Chinese Office Action dated Nov. 3, 2023 issued in counterpart application No. 201911076335.0, 20 pages.
Chinese Office Action dated Mar. 8, 2024 issued in counterpart application No. 201911076335.0, 22 pages.
Chinese Office Action dated Apr. 14, 2023 issued in counterpart application No. 201911076335.0, 36 pages.
Nokia, Nokia Shanghai Bell, 3GPP TSG-RAN WG3 Meeting #104 R3-192765 Reno, US, May 3, 2019, "SN change Failure", pp. 2.

* cited by examiner

[Fig. 1]
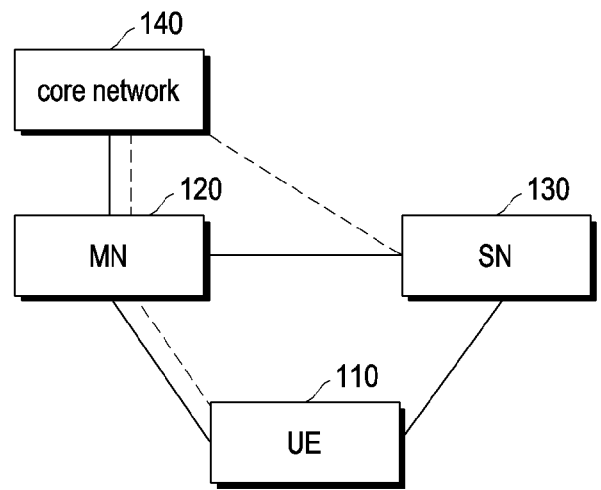
[Fig. 2]
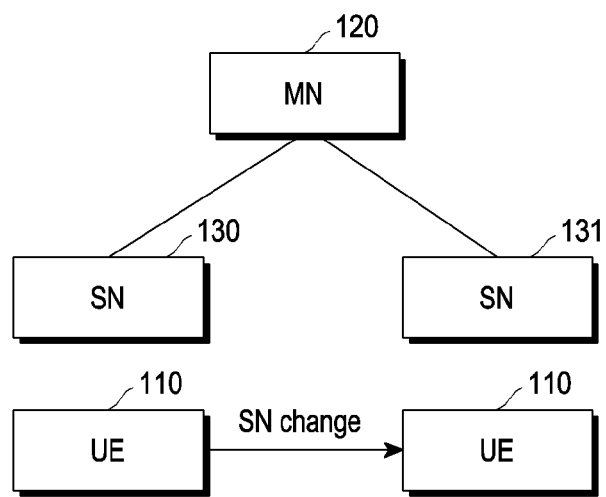

[Fig. 3]
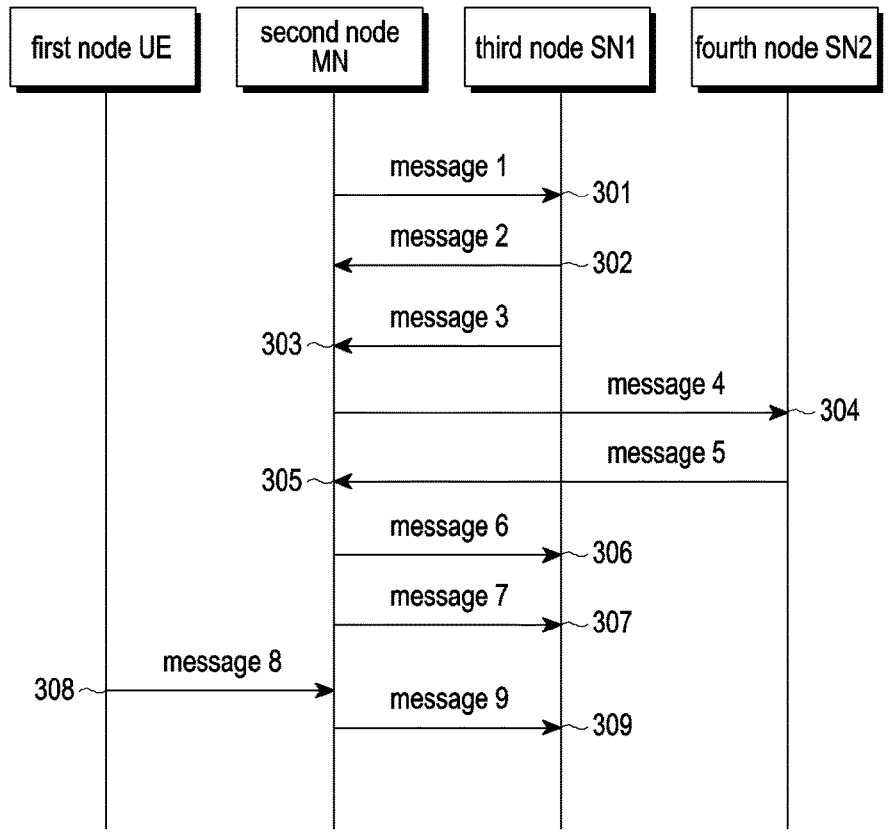
[Fig. 4]
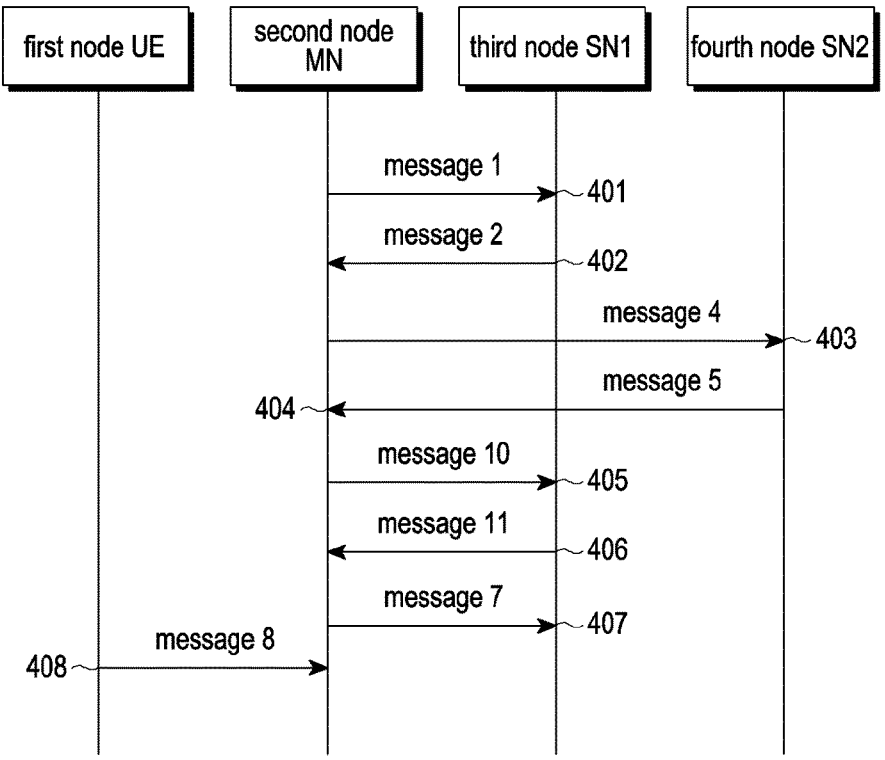

[Fig. 5]
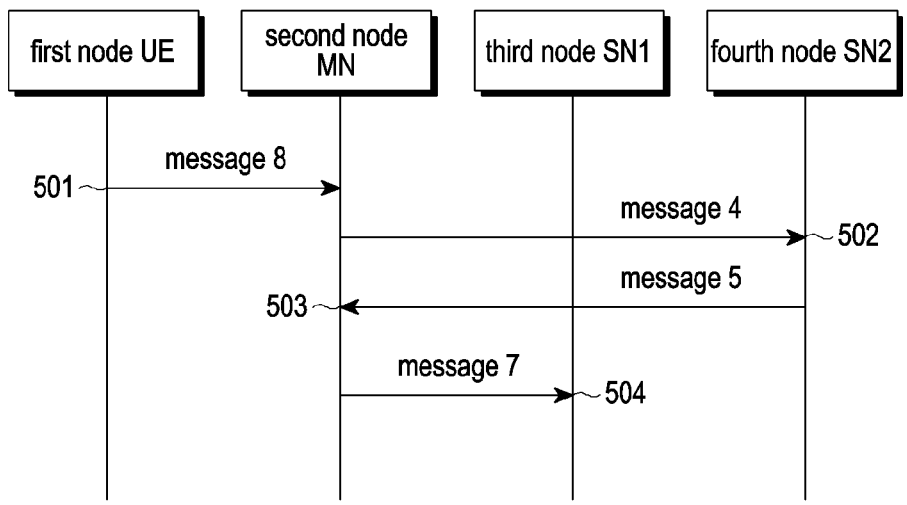
[Fig. 6]
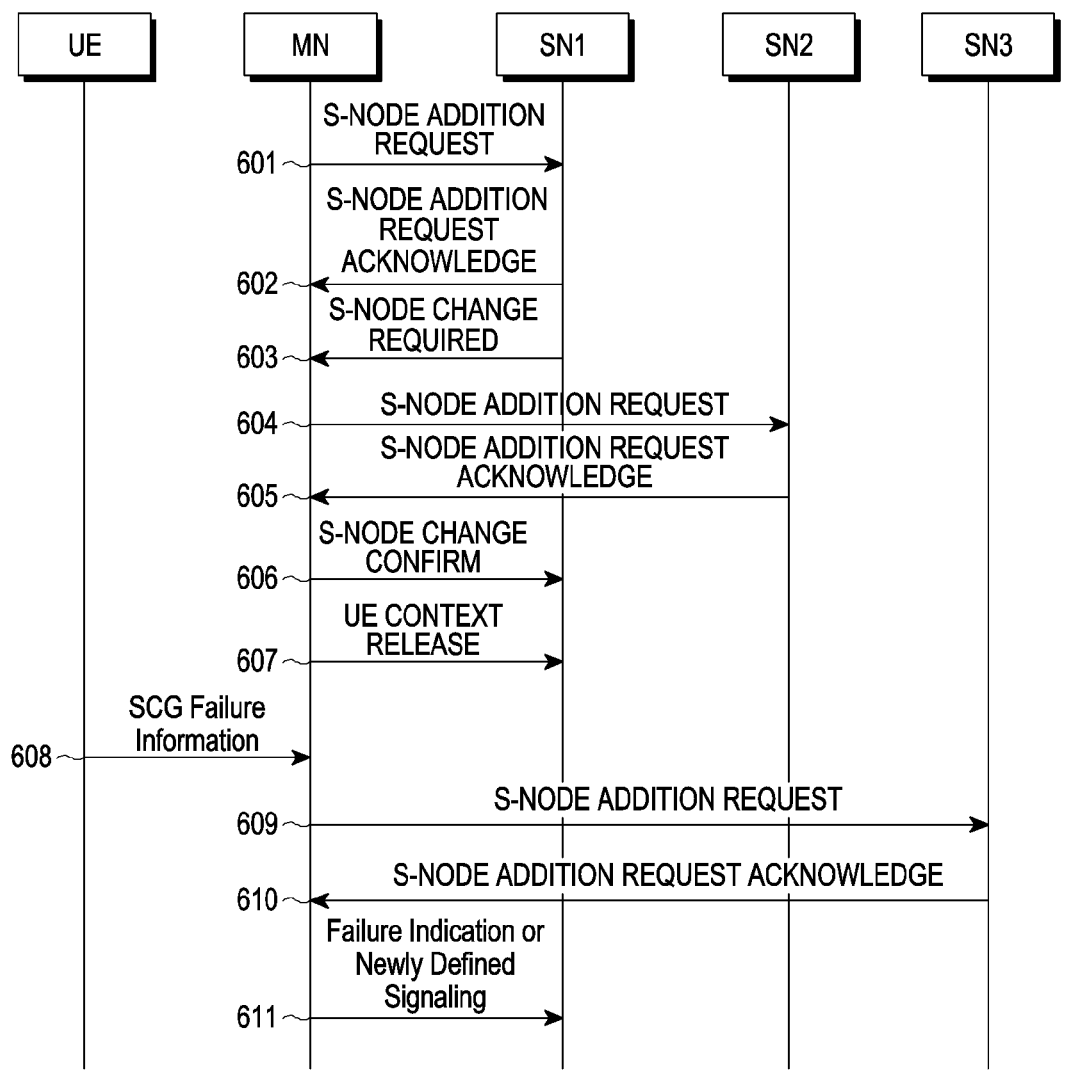

[Fig. 7]
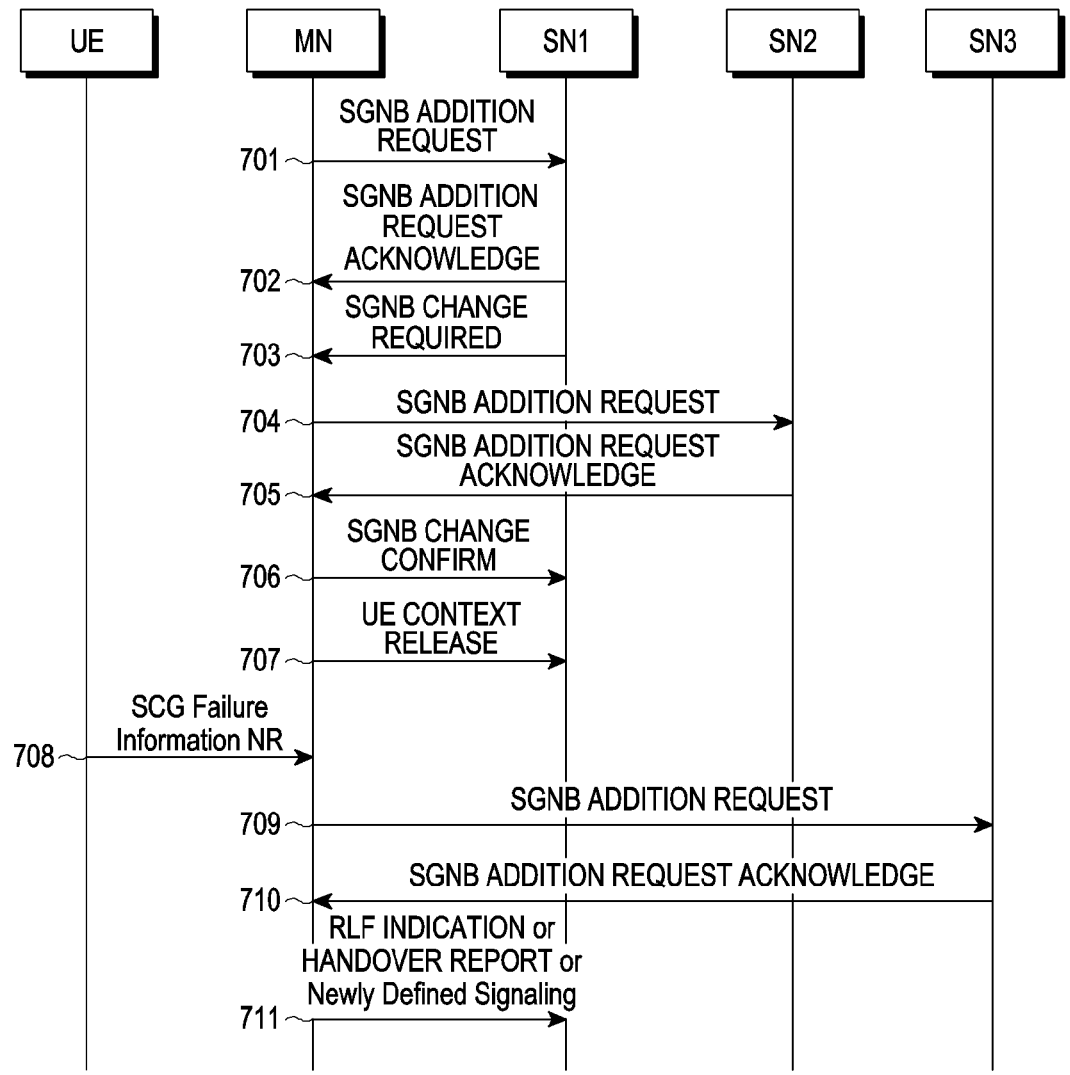

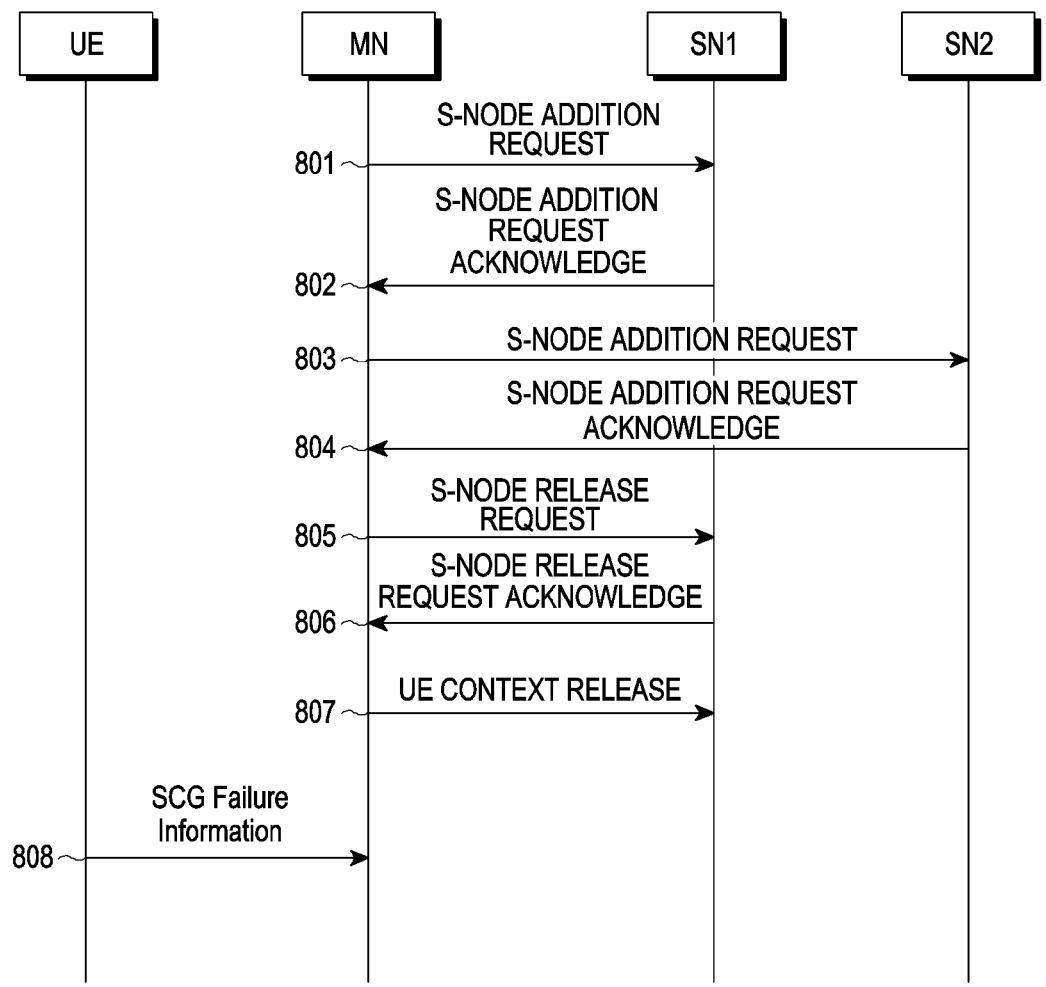

[Fig. 9]
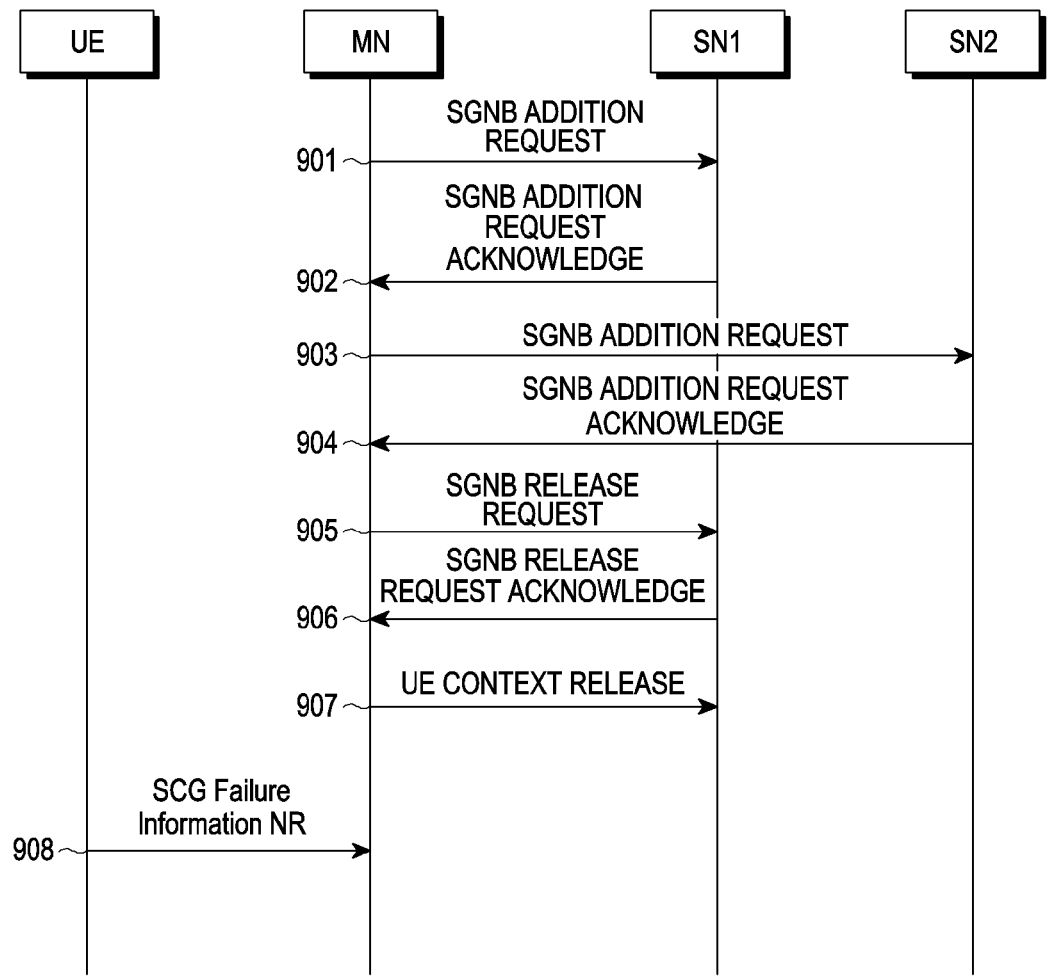

[Fig. 10]
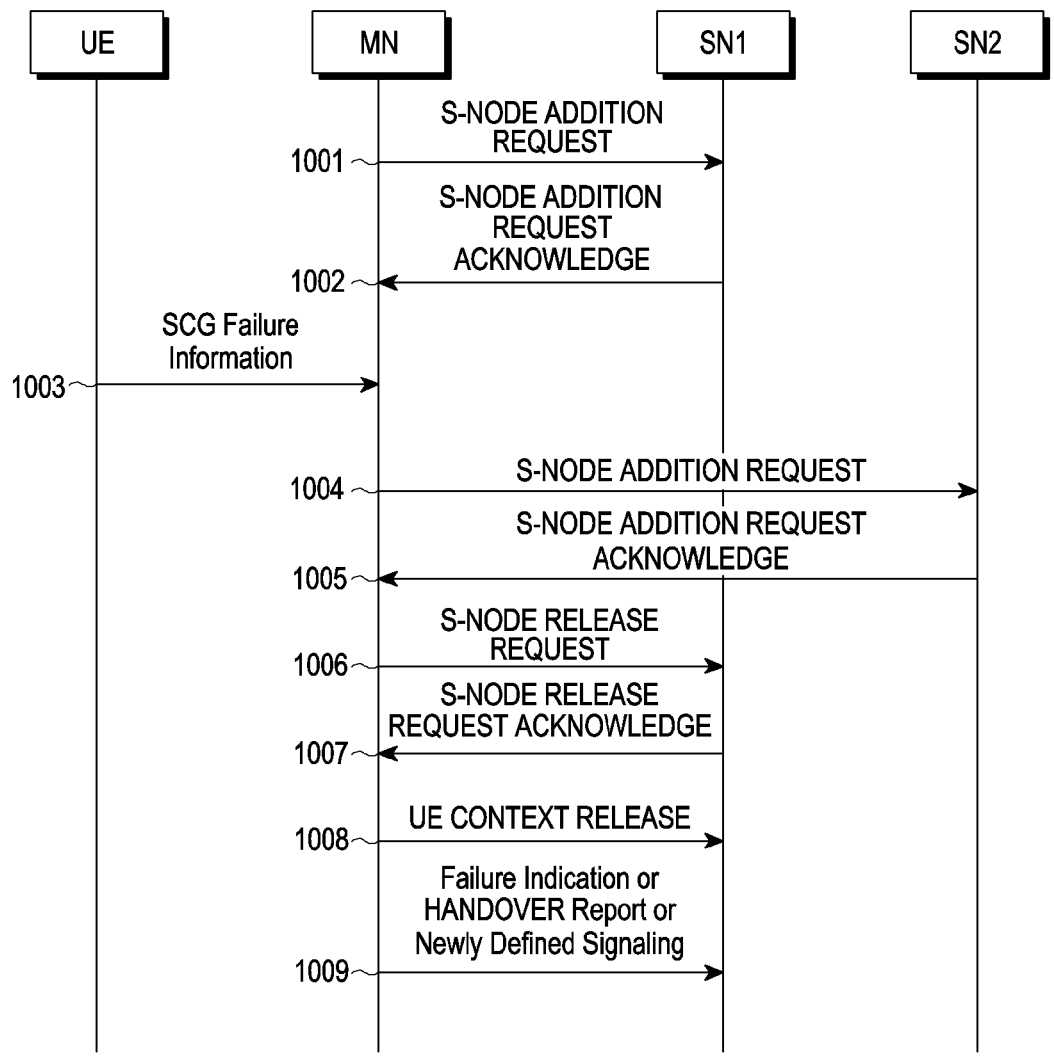

[Fig. 11]
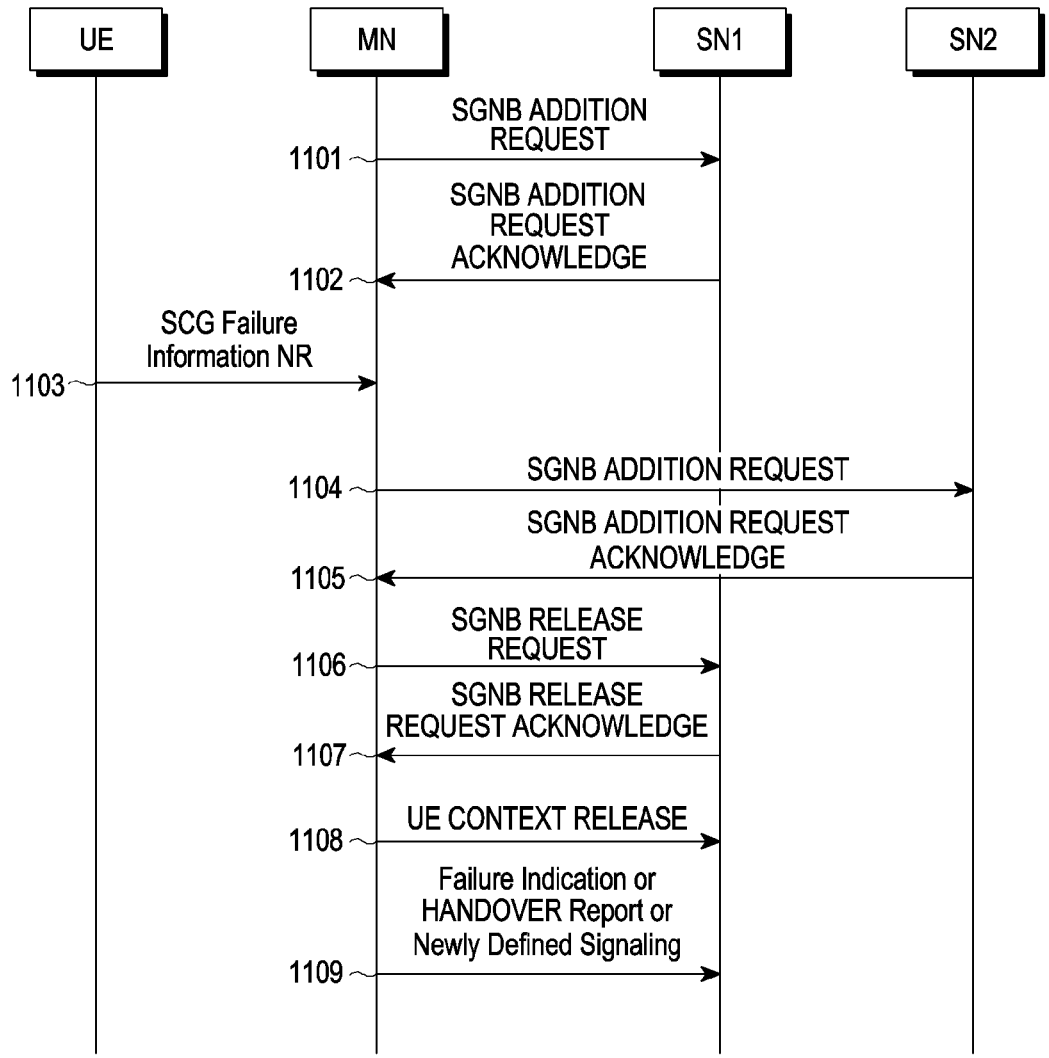
[Fig. 12]
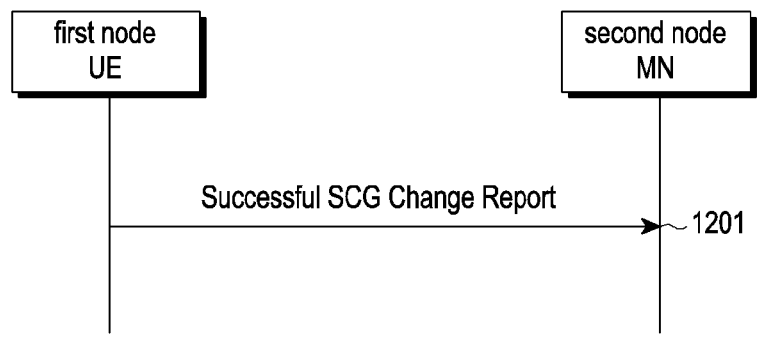

[Fig. 13]
[Fig. 14]
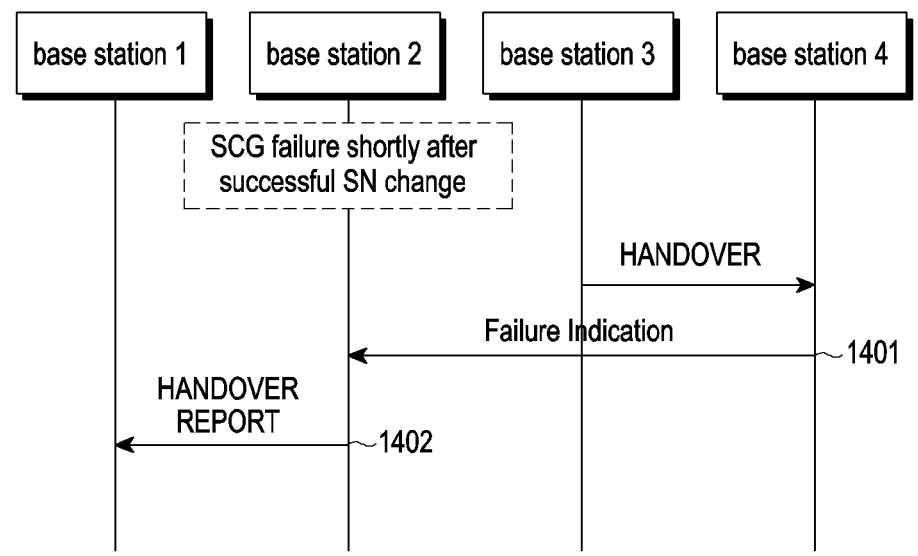

[Fig. 15]
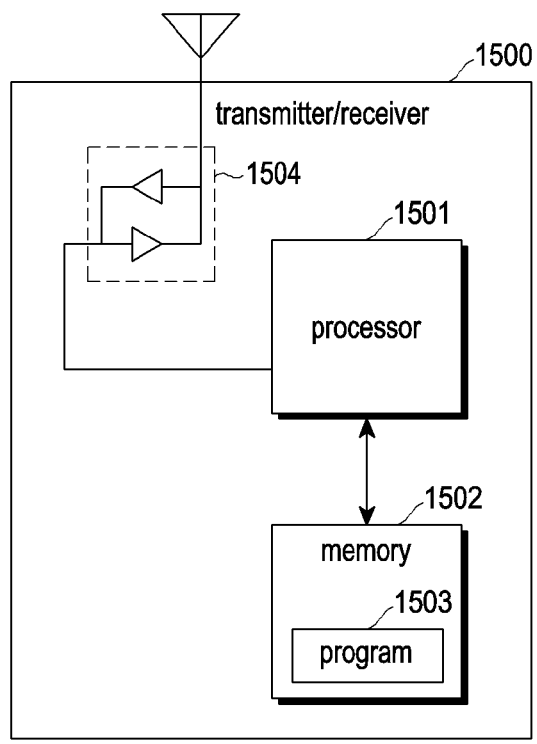

MASTER NODE, SECONDARY NODE AND USER EQUIPMENT IN MOBILE COMMUNICATION NETWORK AND COMMUNICATION METHODS THEREBETWEEN

PRIORITY

This application is a National Phase Entry of PCT International Application No. PCT/KR2020/013325, which was filed on Sep. 29, 2020 and claims priority to Chinese Patent Application Nos. 201910939872.7, 201911052447.2, and 201911076335.0, which were filed on Sep. 30, 2019, Oct. 31, 2019, and Nov. 6, 2019, respectively, the entire content of each of which is incorporated herein by reference.

TECHNICAL FIELD

The present disclosure relates to the mobile communication technology, and specifically to a master node, a secondary node and a user equipment for optimizing a secondary node radio link failure in a mobile communication network and communication methods therebetween.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mecahnisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyperconnectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

User equipment (UE) may establish a wireless connection with one access node, at the same time it may also establish a wireless connection with another access node. The access nodes may be an eNB or a gNB. One of the connected nodes is a master node (hereinafter referred to as MN), and the other one is a secondary node (hereinafter referred to as SN).

FIG. 1 is a schematic diagram of a UE wirelessly connected with different access nodes at the same time. In FIG. 1, solid lines represent a control plane and dotted lines represent a user plane. As shown in FIG. 1, the UE 110 is wirelessly connected with an MN 120 and an SN 130 at the same time, wherein the MN 120 and the SN 130 can communicate with a core network 140 via wires. For the wireless connection shown in FIG. 1, the MN 120 or the SN 130, depending on situations, may decide to change the secondary node currently connected with the UE 110. FIG. 2 is a schematic diagram illustrating the SN changing of the UE 110, in which the SN connected with the UE 110 is changed from the SN 130 to the SN 131.

During the process for changing the SN, a radio link failure of the UE may occur on the new SN. For example, the UE 110 may fail to connect with the changed SN 131. In this situation, the MN may select an SN again and configure the selected SN to the UE. The selected SN may be the same as or may be different from the previous SN with which the UE was connected before the radio link failure.

The decision to change the currently connected SN may be made by the MN or by the currently connected SN. The MN or the SN may decide to select a new SN for the UE when some configuration parameters reach given values. For example, these parameters may include a cell quality measurement result on the current SN, a cell quality measurement result on neighboring SNs, etc. However, network errors may occur if the MN or the SN make the decision to change the current SN at a bad timing due to some reasons, for example, when the configuration parameters are set to inappropriate values. That is, a radio link failure of the UE on the SN may occur before or after the process for changing the SN started. In prior arts, the MN or the SN who made the decision to change the SN lacks sufficient information to determine and adjust the configuration parameters used for selecting the changed SN in time. Therefore, it is still possible to make wrong decisions to change the SN and result in undesired radio link failures in the future.

DISCLOSURE OF INVENTION

Technical Problem

Therefore, the present disclosure proposes a scheme of optimizing a secondary node radio link failure in a mobile communication network. Through this scheme, the related information about the radio link failure of the UE on the SN, which occurs before and after the SN is changed, may be sent to the MN or the SN that makes the decision for changing the SN. According to the information, the MN or the SN may determine whether each of the configuration parameters used to generate the changed SN is set to an inappropriate value and make a correct adjustment. Accordingly, it is avoided that a wrong decision for changing the SN is made in a similar situation in the future, which reduces the unnecessary radio link failure of the UE on the SN, and improves the user experience.

Solution to Problem

According to an aspect, the present disclosure provides a method performed by a master node MN in a mobile communication network. The method comprises: sending a secondary node addition request message to a first target secondary node to request a secondary node (SN), which is connected to a user equipment (UE), to be changed from a source secondary node (SN1) to the first target secondary node (SN2); and receiving, from the UE, a first message about a failure of a secondary cell group (SCG), in response to the UE failing to connect to the SN2

In an implementation, the first message may include at least one of following information: a primary secondary cell (PSCell) identifier of the SN2 where the SCG failure occurs; cell quality measurement results of the PSCell and a neighboring cell of the PSCell of the SN2 where the SCG failure occurs; a PSCell identifier of a previous secondary node to which the UE successfully connects; a time length between the SCG failure and a previous successful secondary node change; a UE identifier assigned by the SN1 for the UE; and a UE identifier assigned by the MN for the UE.

In an implementation, the method may further comprise: receiving, from the UE, a second message about a secondary cell group SCG success where the UE successfully connects to the SN2, the second message including a configuration parameter and/or a measurement result in a successful secondary cell change process.

In an implementation, the method may further comprise: identifying whether a trigger node of the SN change of the UE is the MN or the SN1.

In an implementation, the method may further comprise: identifying a secondary node change failure of the UE and determining a type of the secondary node change failure according to the first message In an implementation, the type of the secondary node change failure includes: being changed to the SN2 too late, being changed to the SN2 too early, or being changed to a wrong secondary node.

In an implementation, the method may further comprise: adjusting a configuration parameter of the secondary node change according to the type of the secondary node change failure and the first message.

In an implementation, the method may further comprise: receiving a secondary node change requirement message from the SN1 before the sending a secondary node addition request message to the SN2; and sending the first message to the SN1 after receiving the first message about a secondary cell group SCG failure from the UE.

In an implementation, the method may further comprise: sending at least one of following information to the SN1: the PSCell identifier of the SN2 where the SCG failure occurs; a node ID of the SN2; the PSCell identifier of a previous secondary node to which the UE successfully connects; a node ID of the previous secondary node to which the UE successfully connects; a PSCell identifier of a second target secondary node (SN3) reselected by the MN for the UE; a node ID of the SN3 reselected by the MN for the UE; SN mobility information; and a UE identifier assigned by the SN1 for the UE.

In an implementation, the method may further comprise: sending the type of the secondary node change failure to the SN1.

In an implementation, the method may further comprise: sending at least one of following information to the SN1: a PSCell identifier of each secondary node to which the UE ever connects; a node ID of the each SN to which the UE ever connects; a time length of the connection between the UE and the each SN, and a reason for each SN change.

In an implementation, the MN may send information to the SN1 using an Xn message or an X2 message.

According to another aspect, the present disclosure provides a method performed by a master node MN in a mobile communication network. The method comprises: receiving, from a UE, a first message about a secondary cell group (SCG) failure related to a source secondary node (SN1); and sending a secondary node addition request message to a target secondary node to request a secondary node (SN), which is connected to the UE, to be changed from the SN1 to the target secondary node (SN2).

In an implementation, the method may further comprise: sending the first message to the SN1.

In an implementation, the first message may include at least one of following information: a primary secondary cell (PSCell) identifier of the SN1 where the SCG failure occurs; cell quality measurement results of the PSCell and a neighboring cell of the PSCell of the SN1 where the SCG failure occurs; a UE identifier assigned by the SN1 for the UE; and a UE identifier assigned by the MN for the UE.

In an implementation, the method may further comprise: identifying a secondary node change failure of the UE and determining a type of the secondary node change failure according to the first message.

In an implementation, the type of the secondary node change failure includes being changed to the SN2 too late.

In an implementation, the method may further comprise: adjusting a configuration parameter of the secondary node change according to the type of the secondary node change failure and the first message.

According to another aspect, the present disclosure provides a method performed by a secondary node SN1 in a mobile communication network. The method comprises: requesting a master node (MN) to change a user equipment (UE) connecting to the secondary node (SN1) to connect to a first target secondary node (SN2); and receiving, from the MN, a first message about a secondary cell group (SCG) failure.

In an implementation, the first message may include at least one of following information: a primary secondary cell (PSCell) identifier of the SN2 where the SCG failure occurs; a node ID of the SN2 where the SCG failure occurs; a PSCell identifier of a previous secondary node to which the UE successfully connects; a node ID of the previous secondary node to which the UE successfully connects; a PSCell identifier of a second target secondary node (SN3) reselected by the MN for the UE; a node ID of the SN3 reselected by the MN for the UE; SN mobility information; a UE identifier assigned by the SN1 for the UE; a type of a secondary node change failure.

In an implementation, the first message includes a second message about the secondary cell group SCG failure received from the UE by the master node MN, and the second message includes at least one of following information: the PSCell identifier of the SN2 where the SCG failure occurs; a cell quality measurement result of the PSCell of the SN2 and a neighboring cell of the PSCell; the PSCell identifier of the previous secondary node to which the UE successfully connects; a time length between the SCG failure and a previous successful secondary node change; a UE identifier assigned by the SN1 for the UE; and a UE identifier assigned by the MN for the UE.

In an implementation, the method may further comprise: identifying the type of the secondary node change failure according to the first message, the type including being changed to the SN2 too late, being changed to the SN2 too early, or being changed to a wrong secondary node.

In an implementation, the method may further comprise: adjusting a configuration parameter of the secondary node change according to the type of the secondary node change failure and the first message.

In an implementation, where the UE successfully connects to the SN2, the first message may include a third message about a secondary cell group SCG success received from the UE by the MN, the third message including a configuration parameter and/or a measurement result in a successful secondary cell change process.

In an implementation, the first message is an Xn message or an X2 message.

According to another aspect, the present disclosure discloses a method performed by a secondary node SN1 in a mobile communication network. The method comprises: receiving, from a master node (MN), a release request for releasing a connection with a UE; sending a release response for releasing the connection with the UE to the MN; and receiving a first message from the MN.

In an implementation, the first message may include at least one of following information: a primary secondary cell (PSCell) identifier of a secondary node where an SCG failure occurs; a node ID of the secondary node where the SCG failure occurs; a PSCell identifier of a previous secondary node to which the UE successfully connects; a node ID of the previous secondary node to which the UE successfully connects; a PSCell o identifier f a target secondary node reselected by the MN for the UE; a node ID of the target secondary node reselected by the MN for the UE; SN mobility information; a UE identifier assigned by the SN1 for the UE; a type of a secondary node change failure.

In an implementation, the first message includes a second message about the secondary cell group SCG failure received from the UE by the master node MN, and the second message includes at least one of following information: the PSCell identifier of the secondary node where the SCG failure occurs; a cell quality measurement result of the PSCell of the secondary node where the SCG failure occurs and a neighboring cell of the PSCell; the PSCell identifier of the previous secondary node to which the UE successfully connects; a time length between the SCG failure and a previous successful secondary node change; a UE identifier assigned by the SN1 for the UE; and a UE identifier assigned by the master node for the UE.

In an implementation, the method may further comprise: identifying the type of the secondary node change failure according to the first message, the type of the secondary node change failure including being changed to the secondary node where the SCG failure occurs too late, being changed to the secondary node where the SCG failure occurs too early, and being changed to a wrong secondary node.

In an implementation, the method may further comprise: adjusting a configuration parameter of the secondary node change according to the type of the secondary node change failure and the first message.

In an implementation, where the UE successfully connects to the target secondary node, the secondary node SN1 receives a second message about a secondary cell group (SCG) success from the UE, the second message including a configuration parameter and/or a measurement result in a successful secondary cell change process. At this time, the state of the SN change is a change success, rather than a SN change failure.

In an implementation, the first message is an Xn message or an X2 message.

According to another aspect, the present disclosure discloses a method performed by a user equipment UE in a mobile communication network. The method comprises: identifying a failure of a change of a connection from a source secondary node (SN1) to a first target secondary node (SN2) or a failure of a connection to the SN1; and sending a first message about a secondary cell group (SCG) failure to a master node (MN).

In an implementation, the first message may include at least one of following information: a primary secondary cell (PSCell) identifier of a secondary node where the SCG failure occurs; a cell quality measurement result of the PSCell of the secondary node where the SCG failure occurs and a neighboring cell of the PSCell; a PSCell identifier of a previous secondary node to which the UE successfully connects; a time length between the SCG failure and a previous successful secondary node change; a UE identifier assigned by the MN for the UE; and a UE identifier assigned by the SN1 for the UE.

In an implementation, the method may further comprise: reconnecting to the SN1 or changing the connection to a second target secondary node (SN3) according to the type of the secondary node change failure identified by the MN.

In an implementation, the method may further comprise: identifying a success of the change of the connection from the SN1 to the SN2; and sending a second message about a secondary cell group SCG success to the MN, the second message including a configuration parameter and/or a measurement result in a successful secondary cell change process.

According to another aspect, the present disclosure provides a method performed by a base station in a mobile communication network. The method comprises: receiving a radio link failure report; and sending, according to the received radio link failure report, the radio link failure report, and/or user equipment (UE) history information, and/or movement history information report reported by a UE to another base station through an inter-base station interface or an interface between the base station and a core network node, wherein the movement history information report includes cell identifier information of a secondary cell group (SCG) cell to which the UE ever connects, and/or a time length of the connection between the UE and the cell.

The present disclosure further provides a master node, a secondary node and a UE for performing the above method.

The present disclosure further provides a computer readable storage medium storing a computer instruction for performing the above method.

BRIEF DESCRIPTION OF DRAWINGS

FIG. 1 is a schematic diagram of a UE being in wireless connection with different access nodes at the same time.

FIG. 2 is a schematic diagram of changing the SN connected with UE 110.

FIG. 3 is a schematic diagram of a first embodiment of the present disclosure.

FIG. 4 is a schematic diagram of a second embodiment of the present disclosure.

FIG. 5 is a schematic diagram of a third embodiment of the present disclosure.

FIG. 6 is a schematic diagram of a fourth embodiment of the present disclosure.

FIG. 7 is a schematic diagram of a fifth embodiment of the present disclosure.

FIG. 8 is a schematic diagram of a sixth embodiment of the present disclosure.

FIG. 9 is a schematic diagram of a seventh embodiment of the present disclosure.

FIG. 10 is a schematic diagram of an eighth embodiment of the present disclosure.

FIG. 11 is a schematic diagram of a ninth embodiment of the present disclosure.

FIG. 12 is a schematic diagram of a tenth embodiment of the present disclosure.

FIG. 13 is a schematic diagram of an eleventh embodiment of the present disclosure.

FIG. 14 is a schematic diagram of a twelfth embodiment of the present disclosure.

FIG. 15 is a simplified block diagram of an entity applicable to implement embodiments of the present disclosure

MODE FOR THE INVENTION

The present disclosure will be further described below in detail in reference to the accompanying drawings and the embodiments. It may be appreciated that the specific embodiments described herein are merely used for explaining the relevant exemplary implementation scheme, rather than limiting the present disclosure.

It should be noted that the embodiments in the present disclosure or the features in the embodiments may be combined with each other on a non-conflict basis. The present disclosure will be described below in detail with reference to the accompanying drawings and in combination with the embodiments.

The terms used in the present disclosure are used to describe particular embodiments, and do not intend to limit the scope of other embodiments. The expression that does not clearly indicate a specific number may generally refer to one or more, unless otherwise clearly explained. All terms (including technical and scientific terms) used herein may have the same meaning as the terms commonly understood by those skilled in the art to which the present disclosure belongs.

In the following description, a base station is an access device that connects a communication device to a cellular network, which is used for allocating communication resources to the communication device. The base station may be any of the following entities: a gNB, an ng-eNB, an eNB, a radio access unit, a base station controller, a base transceiver station, and the like. The communication device may be any device that intends to access a service via an access network and can be configured to communicate through the access network. For example, the communication device may include, but not limited to, a user equipment (UE), a mobile station (MS), a cellular phone, a smart phone, a computer, or a multimedia system configured with a communication function. It should be noted that in the following description, the terms "communication device", "user device", "user equipment", "terminal" and "UE" may be used interchangeably.

It should be understood that the embodiments disclosed herein may be applied in various types of cellular networks.

Various embodiments of the present disclosure may include a master node (MN). The master node is a node that provides a wireless connection service to the UE and is connected with a core network. The master node may be a gNB or an eNB, or an ng-eNB. The various embodiments of the present disclosure may further include a secondary node (SN). The SN provides a wireless connection service to the UE. The SN may be not connected with the node of the core network in the control plane, but may be connected with the node of the core network in the user plane. The SN may be a gNB, an eNB, an ng-eNB, or an en-gNB.

According to a first implementation of the present disclosure, where the UE connects to the MN and a source secondary node SN1 at the same time, the MN changes the SN, which is connected to the UE, from the SN1 to a first target secondary node SN2. When failing to connect to the SN2, the UE sends a report message about the failure of a secondary cell group (SCG) to the MN.

Optionally, the report information of the failure of SCG (hereinafter, "SCG failure"), which is received from the UE by the MN, may include one or more of the following information: a cell identifier (Failed PSCell Id) of a primary secondary cell (PSCell) to which the SN2 where the SCG failure occurs belongs; a measurement report of the PSCell to which the SN2 where the SCG failure occurs belongs and a neighboring cell; a cell identifier (Previous PSCell Id) of a PSCell to which a previous SN to which the UE successfully connects before the SN change belongs; a time length between the SCG failure and a previous successful SN change; a UE identifier assigned by the SN; and a UE identifier assigned by the MN. The UE identifier assigned by the SN may be a C-RNTI.

Optionally, the MN determines a trigger node used in the SN change process and saves the trigger node for backup. The trigger node is a node that makes a decision to change the SN and initiates the SN change process. For example, the trigger node may be the master node MN, or may be the source secondary node SN1.

If the trigger node is the master node, that is, the current SN change process is initiated by the master node, the master node may determine that the SN change fails according to the received report information, and determine a type of the SN change failure. For example, the type of the SN change failure may include: being changed to the SN2 too late (SN change too late), being changed to the SN2 too early (SN change too early), and being changed to a wrong secondary node (SN change to wrong cell). According to the received report information and the failure type determined based on the report information, the master node may adjust configuration parameters for the SN change. The adjusted configuration parameters may be used by the master node when deciding the SN change next time, to avoid a similar SN change failure.

If the trigger node is the secondary node SN1 (i.e., the SN change process is decided by the SN1) or the master node cannot determine the trigger node, the master node sends the information of the SCG failure to the secondary node. Optionally, the information of the SCG failure sent to the secondary node SN1 by the master node includes one or more of the following information: the cell identifier (Failed PSCell Id) of a cell to which the secondary node SN2 where the SCG failure occurs belongs; the measurement report of the cell to which the SN2 where the SCG failure occurs belongs and the neighboring cell; the cell identifier (Previous PSCell Id) of a cell to which a previous secondary node SN1 to which the UE successfully connects before the SN change belongs; an identifier (Serving PSCell Id) of a second target secondary node SN3 reselected by the master node MN for the UE after the SCG failure, SN mobility information, and the UE identifier assigned by the SN. Here, the UE identifier may be the C-RNTI, or may be an identifier on an Xn or X2 interface (depending on a specific scenario) assigned by the SN for the UE. The SN mobility information (which corresponds to a set of configuration parameters for an SN handover) is a digital identifier generated by the SN1 and associated with a configuration parameter in the SN1 that is used to decide the SN change. The SN1 may find out the configuration parameter in the SN1 that is used to decide the SN change, according to the identifier. Optionally, before the SN change, the SN1 may generate the SN mobility information, and send the SN mobility information to the MN in the SN addition process or the SN change process. Optionally, the information sent to the secondary node SN1 by the master node further includes: the node identifier (Failed SN ID) of the secondary node SN2 where the SCG failure occurs, the node identifier (Previous SN ID) of the previous secondary node SN1 to which the UE successfully connects before the SN change, the identifier (Serving SN Id) of the second target secondary node SN3 reselected by the master node MN for the UE after the SCG failure. Optionally, the information sent to the secondary node SN1 by the master node further includes a message about the SCG failure received from the UE by the master node MN. The message includes at least one of the following information: the cell identifier of a PSCell of the secondary node SN2 where the SCG failure occurs, a cell quality measurement result of the PSCell of the SN2 where the SCG failure occurs and a neighboring cell of the PSCell, the cell identifier of a PSCell of the previous SN to which the UE successfully connects, the time length between the SCG failure and the previous successful secondary node change; a UE identifier assigned by the SN1 for the UE, and the UE identifier assigned by the MN for the UE. The SN1 may determine that the SN change fails according to the received information, and determine the type of the SN change failure. For example, the type of the SN change failure may include: being changed to the SN2 too late (SN change too late), being changed to the SN2 too early (SN change too early), and being changed to the wrong secondary node (SN change to wrong cell). According to the received report information and the failure type determined based on the report information, the SN1 may adjust configuration parameters of the SN change. The adjusted configuration parameters may be used by the SN1 when deciding the SN change next time, to avoid a similar SN change failure.

Optionally, where the trigger node is the secondary node SN1 or the MN cannot determine the trigger node, the MN may also determine that the SN change fails according to the received report information, and determine the type of the SN change failure. In this case, the information of the SCG failure sent to the secondary node by the MN may further include the failure type of the SN failure determined by the master node.

Each message sent between the MN and the SN in the above process may be an Xn message or an X2 message, and the message sent by the UE to the MN is an RRC message.

Optionally, the master node may send the information of the SCG failure to the secondary node using the Xn message. The Xn message may be a failure indication, or a handover report, or a UE context release, or a secondary node release request (S-NODE RELEASE REQUEST), or a newly defined Xn message, for example, SN change failure information. The master node may also send the information of the SCG failure to the secondary node using the X2 message. The X2 message may be a failure indication (RLF indication), or a handover report, or a UE context release, or a secondary node release request (SGNB release request), or a newly defined X2 message, for example, SN change failure information.

Optionally, the report information of the SCG failure received from the UE may be EUTRAN RRC message SCGFailureInformation or SCGFailureInformationNR; or may be NR RRC message SCGFailureInformation or SCGFailureInformationEUTRA. Optionally, where the SCG is successful, the MN receives report information of the SCG success from the UE. The report information of the SCG success received from the UE may be an NR RRC message successful secondary cell group change report (SuccessfulSCGChangeReport) or an EUTRAN RRC message successful secondary cell group change report (SuccessfulSCGChangeReport).

Optionally, the master node sends at least one of the following information to the source secondary node SN1: the cell identifier of a PSCell of each secondary node to which the UE connects, the node ID of the each secondary node to which the UE connects, the time length of the connection between the UE and the each secondary node, and the reason why each secondary node is changed.

Optionally, where the UE successfully connects to the first target secondary node SN2, the UE sends a report message about the secondary cell group (SCG) success to the master node MN. Although the SN change is successful, in the process of successful SN change, the SN change may not be going well and may encounter some errors. Therefore, the information includes configuration parameters and/or a measurement result in the process of successful SN change (for example, the configuration parameter and the measurement result of the UE itself), and generally refers to information that is wrong but does not make the SN change fail. In the above process, although no SCG failure occurs, the above SN change has additional costs. The above information may be used by the node initiating the SN change, to adjust the parameter configuration information corresponding to the initiation of the SN change, thereby optimizing the mechanism of deciding to initiate the SN change process to avoid additional costs generated in subsequent SN changes. Therefore, optionally, the master node determines the type of the SCG failure according to the report message about the SCG failure or the SCG success received from the UE, and the determined type of the SCG failure may also include the SCG success but in which an error is encountered.

According to a second implementation, where the connection with the source secondary node SN1 fails, the UE sends the report message about the secondary cell group (SCG) failure to the master node MN. The report message includes, for example, at least one of the following information: a cell identifier (PSCell ID) of the source secondary node SN1 where the SCG failure occurs, a cell quality measurement result of the cell of the source secondary node SN1 where the SCG failure occurs and a neighboring cell of the cell, and an UE identifier assigned by the SN, and an UE identifier assigned by the MN. The UE identifier assigned by the SN may be the C-RNTI. The UE identifier assigned by the MN may be a C-RNTI. Optionally, the MN sends the received report information to the SN1.

Optionally, the master node MN identifies that the secondary node handover of the UE fails according to the received report message, and determines that the type of the secondary node handover failure is "being changed to the SN2 too late (SN change too late)", and connects the UE to the first target secondary node SN2 according to the identified failure type and the report message. According to the identified type of the SN handover failure and the report, the MN adjusts the configuration parameters of the secondary node handover.

The exemplary description is discussed below on the above embodiments.

A first embodiment describes the case where, in the first implementation the SN decides to initiate the SN change process and the secondary cell group failure (SCG failure) occurs within a short time after the SN change success, or the SCG failure occurs in the SN change process.

FIG. 3 is a schematic diagram of the first embodiment of the present disclosure, including the following steps:

In step 301, a second node MN sends a message 1 to a third node SN1.

In step 302, the third node SN1 sends a message 2 to the second node MN. The message 2 may carry associated information (i.e., the SN mobility information described above) of a configuration parameter in the third node SN1 that is used to decide the SN change.

In step 303, the third node SN1 sends a message 3 to the second node MN. The message 3 may also carry the associated information of the configuration parameter in the third node SN1 that is used to decide the SN change.

In step 304, the second node MN sends a message 4 to a fourth node SN2. The message 4 may carry information of an SN to which a UE ever connects.

In step 305, the fourth node SN2 sends a message 5 to the second node MN.

In step 306, the second node MN sends a message 6 to the third node SN1.

In step 307, the second node MN sends a message 7 to the third node SN1.

In step 308, a first node UE sends a message 8 to the second node MN. The message 8 may carry the identifier information of a last successfully connected SN, and/or the identifier information of an SN where the SCG failure occurs, and/or the time length between a previous successful SN change event and the SCG failure event, and/or a UE identifier assigned by the SN for the UE; and a UE identifier assigned by the MN for the UE. The UE identifier may be a C-RNTI. The identifier information of the SN includes the PSCell ID of a cell to which the SN belongs.

In step 309, the second node MN sends a message 9 to the third node SN1. The message 9 may carry the associated information of the configuration parameter used to decide the SN change and carried in the step 30 or step 303. The message 9 may carry the identifier information of the last successfully connected SN, and/or the identifier information of the SN where the SCG failure occurs, and/or identifier information of an SN to which the UE currently connects. The identifier information of the SN includes the PSCell ID of the cell to which the SN belongs. Optionally, the identifier information of the SN may further include the node ID of the SN.

If the second node SN1 does not send the message 7 at the time of receiving the message 8, the message 7 may be the same as the message 9.

Hereinafter, an exemplary description will be performed on a specific scenario of the first embodiment with reference to FIG. 6 and FIG. 7.

A second embodiment describes the case where, in the first implementation, the MN decides to initiate the SN change process and the SCG failure occurs within a short time after the success.

FIG. 4 is a schematic diagram of the second embodiment of the present disclosure, including the following steps (in which the same message number as that in FIG. 3 represents the same or similar message):

In step 401, a second node MN sends a message 1 to a third node SN1.

In step 402, the third node SN1 sends a message 2 to the second node MN. The message 2 may carry associated information of a configuration parameter in the third node SN1 that is used to decide the SN change.

In step 403, the second node MN sends a message 4 to a fourth node SN2. The message 4 may carry information of an SN to which a UE ever connects.

In step 404, the fourth node SN2 sends a message 5 to the second node MN.

In step 405, the second node MN sends a message 10 to the third node SN1.

In step 406, the third node SN1 sends a message 11 to the second node MN.

In step 407, the second node MN sends a message 7 to the third node SN1.

In step 408, a first node UE sends a message 8 to the second node MN. The message 8 may carry the identifier information of a last successfully connected SN, and/or the identifier information of an SN where the SCG failure occurs, and/or the time length between a previous successful SN change event and the SCG failure event, and/or a UE identifier assigned by the SN for the UE; and a UE identifier assigned by the MN for the UE. The UE identifier may be a C-RNTI. The identifier information of the SN includes the PSCell ID of a cell to which the SN belongs.

Hereinafter, an exemplary description will be provided to explain a specific scenario of the second embodiment with reference to FIG. 8 and FIG. 9.

A third embodiment describes the case where, in the second implementation, the UE has connected to the SN, and the MN configures a new SN for the UE after the SCG failure.

FIG. 5 is a schematic diagram of the third embodiment of the present disclosure, including the following steps (in which the same message number as that in FIG. 3 represents the same or similar message):

In step 501, a first node UE sends a message 8 to a second node MN. The message 8 may carry identifier information of an SN where the SCG failure occurs. The identifier information of the SN includes the PSCell ID of a cell to which the SN belongs.

In step 502, the second node MN sends a message 4 to a fourth node SN2.

In step 503, the fourth node SN2 sends a message 5 to the second node MN.

In step 504, the second node MN sends a message 7 to the third node SN1. The message 7 may carry identifier information of an SN to which the UE currently connects. The identifier information of the SN includes the PSCell ID of a cell to which the SN belongs. Optionally, the identifier information of the SN may further include the node ID of the SN.

Hereinafter, an exemplary description will be provided to explain a specific scenario of the second embodiment with reference to FIG. 10 and FIG. 11.

FIG. 6 is a schematic diagram of a fourth embodiment of the present disclosure. The fourth embodiment refers to the following specific scenario of the first embodiment: the UE has connected to the MN. The UE is configured to add a secondary node SN1. The SN1 decides to initiate the SN change process and change the secondary node to an SN2. The SCG failure of the UE on the SN2 occurs within a short time after the success, or the SCG failure occurs in the SN change process. The UE is configured to add a secondary node SN3. The MN is a gNB. The SN1, the SN2, and the SN3 may be a gNB or an ng-eNB.

The fourth embodiment shown in FIG. 6 includes the following steps:

In step 601, the MN sends an Xn signaling secondary node addition request (S-NODE ADDITION REQUEST) to the SN1, to require the SN1 to configure a resource for the UE. The signaling carries PDU session information that needs to be configured on the SN1. For example, the PDU session information includes the identifier of a PDU session, the identifier of a QoS flow included in the session, and a quality requirement of the QoS flow. The signaling may further carry SCG configuration information, and the SCG configuration information includes capability information of the UE.

In step 602, after receiving the signaling described in the previous step, the SN1 allocates the resource as required by the signaling. The SN1 sends an Xn signaling secondary node addition response (S-NODE ADDITION REQUEST ACKNOWLEDGE) to the MN, to notify the MN of the received PDU session information. The signaling may carry new SCG configuration information provided by the SN1 and sent to the MN through an RRC container, and the MN sends the SCG configuration information to the UE through an RRC message. The signaling may also carry the SN Mobility Information. The SN mobility information (which corresponds to a set of configuration parameters for an SN handover) is generated by the SN1, and is a digital identifier associated with the configuration parameters used to decide the SN change. The SN provides this information to the MN for the purpose of a later analysis on the cause of a wrong SN handover. For example, the SN sends the information to the MN, and the MN then saves the information. If the MN receives a message of the SN failure reported by the UE, the MN may send the information contained in the message to the SN. The SN may determine which parameter/parameters are needed to be adjusted, according to the report information of the UE and the configuration information corresponding to the SN mobility information. The MN adds the information of the SN1 to the UE history information saved by the MN, to use the information as the information of an SN to which the UE currently connects. The information of the SN1 may be the SN identifier information of the SN1, and/or the time length of the connection between the UE and the SN, and/or the reason why the SN of the UE is configured as the SN1. The SN identifier information includes a PSCell ID. Optionally, the SN identifier information may also include a node ID. Optionally, the MN may save the information of the SN1 as a separate information part, rather than add the information to the UE history information.

The SN1 receives a measurement report of the UE which may be forwarded by the MN to the SN1, or the SN1 directly receives the measurement report from the UE. The SN1 decides to initiate the SN change process and change the SN of the UE from the SN1 to the SN2.

In step 603, the SN1 sends an Xn signaling secondary node change requirement (S-NODE CHANGE REQUIRED) to the MN, to notify the MN to change the SN of the UE to the SN2. The information carries the node identifier of the SN2, and may further carry the newest SCG configuration information. The signaling may further carry field information SN Mobility Information. The information is used to indicate the set of configuration parameters related to the SN handover, as shown in step 602. The MN determines that this SN change process is triggered by the SN1, and saves this information.

In step 604, the MN sends an Xn signaling secondary node addition request (S-NODE ADDITION REQUEST) to the SN2, to require the SN2 to configure a resource for the UE.

In step 605, after receiving the signaling described in step 604, the SN2 allocates the resource as required by the signaling. The SN2 sends an Xn signaling secondary node addition response (S-NODE ADDITION REQUEST ACKNOWLEDGE) to the MN.

The MN adds the information of the SN2 to the UE history information saved by the MN, to use the information as the information of an SN to which the UE currently connects. The information of the SN2 may be the SN identifier information of the SN2, and/or the time length of the connection between the UE and the SN, and/or the reason why the SN of the UE is configured as the SN2. The SN identifier information includes a PSCell ID. Optionally, the SN identifier information may also include a node ID. Optionally, the MN may save the information of the SN2 as a separate information part, rather than add the information to the UE history information.

In step 606, the MN sends an Xn signaling secondary node change confirmation (S-NODE CHANGE CONFIRM) to the SN1. The SN1 stops sending data to the UE after receiving the signaling. In step 607, the MN sends an Xn signaling UE context release to the SN1. The SN1 releases the UE context and the resource of the UE context, after receiving the signaling.

The SCG failure of the UE occurs on the SN2 within a short time after the success of the SN change process. Optionally, the SCG failure occurs in the SN change process.

In step 608, the UE sends an NR RRC message secondary cell group failure information (SCGFailureInformation) to the MN.

When detecting the SCG failure, the UE reports the message of the SCG failure to the MN.

If the SCG failure occurs after the SN change is successful, the message SCGFailureInformation may carry the identifier information (Previous PSCell Id) of a PSCell to which an SN (to which the UE successfully connects before the SN change) belongs, and/or the identifier information (Failed PSCell Id) of a PSCell to which the SN where the SCG failure occurs belongs, and/or the time length (timeSCGChangeFailure) between a previous successful SN change and the SCG failure event. If the SN2 is an ng-eNB, the UE sends an NR RRC message EUTRA secondary cell group failure information (SCGFailureInformationEUTRA) to the MN. The message may carry the identifier information (Previous PSCell Id) of the PSCell to which the SN to which the UE successfully connects before the SN change belongs, and/or the identifier information (Failed PSCell Id) of the PSCell to which the SN where the SCG failure occurs belongs, and/or the time length (timeSCGChangeFailure) between the previous successful SN change and the SCG failure event, and/or a UE identifier assigned by the SN for the UE, and/or a UE identifier assigned by the MN for the UE. The UE identifier may be a C-RNTI.

If the SCG failure occurs in the SN change process, the message SCGFailureInformation may carry the identifier information (Previous PSCell Id) of the PSCell to which the SN (to which the UE successfully connects before the SN change) belongs, and/or the identifier information (Failed PSCell Id) of the PSCell to which the SN where the SCG failure occurs belongs. The value of the subfield failureType of the field FailureReportSCG carried in the message may be set to scg-ChangeFailure. If the SN2 is an ng-eNB, the UE sends an NR RRC message SCGFailureInformationEUTRA to the MN. The message may carry the identifier information (Previous PSCell Id) of the PSCell to which the SN (to which the UE successfully connects before the SN change) belongs, and/or the identifier information (Failed PSCell Id) of the PSCell to which the SN where the SCG failure occurs belongs.

According to the time when the SN to which the UE currently connects in the UE history message saved by the MN is set to the SN2 and the time when the MN receives the message of the SCG failure sent by the UE, the MN updates the time length of the connection between the UE and the SN in the information of the SN2 in the UE history message saved by the MN.

After step 608, the MN may send a secondary node release request message to notify the SN2 to release the UE context.

The MN may determine the reason/type of the SN change failure according to the information received in step 608 and the information saved by the MN.

Specifically, the MN determines that the SN to which the UE connects before the SN change is the SN1 according to the Previous PSCell ID included in the RRC message received from the UE, and determines that the SN where the SCG failure occurs is the SN2 according to the Failed PSCell ID included in the RRC message. The MN selects a new SN for the UE according to the measurement report carried in the message of the SCG failure reported by the UE. In this embodiment, the new SN is the SN3. One of the following two conditions is satisfied: the message of the SCG failure reported by the UE carries the timeSCGChangeFailure, and the value of the timeSCGChangeFailure is lower than a preconfigured threshold; or the message of the SCG failure reported by the UE does not carry the timeSCGChangeFailure, or the value of the failureType in the message is scg-ChangeFailure. According to the above information, the MN determines that the type of this SN change failure is "being changed to the wrong secondary node (SN Change to wrong cell)".

Optionally, the MN determines that the SN to which the UE connects before the SN change is the SN1 according to the information of the SN before the SN to which the UE currently connects in the saved UE history information, and determines that the SN where the SCG failure occurs is the SN2 according to the information of the SN to which the UE currently connects in the saved UE history information. The MN selects a new SN for the UE according to the measurement report carried in the message of the SCG failure reported by the UE. In this embodiment, the new SN is the SN3. In addition, the value of the time length of the connection between the UE and the SN in the UE history information saved by the MN is lower than a preconfigured threshold. According to the above information, the MN determines that the type of this SN change failure is "being changed to the wrong secondary node (SN Change to wrong cell)".

In step 609, the MN sends an Xn signaling secondary node addition request (S-NODE ADDITION REQUEST) to the SN3.

When receiving the report message of the SCG failure, the MN selects a new secondary node SN for the UE according to the measurement report sent by the UE. The MN sends a secondary node establishment request message to the new secondary node SN. The signaling may carry one or more of the following information:

UE history information, which may include the identifier information of an SN to which the UE ever connects, and/or the time length of the connection between the UE and the SN, and/or the reason for changing the SN, and SN information, the SN information including the identifier information the SN to which the UE ever connects, and/or the time length of the connection between the UE and the SN, and/or the reason for changing the SN.

The identifier information of the SN includes a PSCell ID. Optionally, the identifier information of the SN may further include a node ID.

In step 610, the SN3 sends an Xn signaling secondary node addition response (S-NODE ADDITION REQUEST ACKNOWLEDGE) to the MN. The MN adds the information of SN3 to the UE history information saved by the MN, to use the information as the information of the SN to which the UE currently connects. The information of the SN3 may be the SN identifier information of the SN3, and/or the time length of the connection between the UE and the SN, and/or the reason why the SN of the UE is configured as the SN3. The identifier information of the SN includes a PSCell ID. Optionally, the identifier information of the SN may also include a node ID. Optionally, the MN may save the information of the SN3 as a separate information part, rather than add the information to the UE history information.

The MN may know that this SN change process is triggered by the SN1, according to the foregoing saved information. Therefore, the MN notifies the SN1 of the relevant information of the SCG failure.

In step 611, the MN sends Xn signaling to the SN1 to notify the information of the SN failure. The signaling may be a failure indication, or an Xn signaling handover report, or a newly defined signaling.

Step 611 may be performed at any time after step 608.

If step 607 has not been performed when it is necessary to perform step 611, the signaling may also be an Xn signaling UE context release request.

The signaling may include the following one or more pieces of information:

- Information (SN mobility information) carried in step 602 or step 603.
- Identifier information (Previous SN Information) of the SN to which the UE successfully connects before the SN change.
- Identifier information (Failed SN Information) of the SN where the SCG failure occurs.
- Identifier information (Serving SN Information) of an SN that is reconfigured by the MN for the UE and to which the UE successfully connects, after the UE reports the SCG failure.

The above SN identifier information includes a PSCell ID. Optionally, the SN identifier information may further include a node ID.

- RRC message secondary cell group failure information received in step 608.
- Field information SCG Failure Type indicating the SCG failure type, of which the value may repsent "SN change too late", "SN change too early" and "SN change to wrong cell" to indicate the type of the SN change failure determined by the MN. For example, if the MN determines that the type of the SN change failure is "SN change to wrong cell", the value of the SCG Failure Type may be "SN change to wrong cell".
- UE history information, which may include SN information, for example, the identifier information of the SN to which the UE ever connects, and/or the time length of the connection between the UE and the SN, and/or the reason for changing the SN.
- Separate SN information, the SN information including the identifier information of the SN to which the UE ever connects, and/or the time length of the connection between the UE and the SN, and/or the reason for changing the SN.
- Indication of whether the SCG failure occurs in or after the SN change process. The indication may also be a type of an SCG error, for example, an SCG wireless connection error, or an SCG change error.

After receiving the signaling in step 611, if the signaling does not include the field information SCG Failure Type indicating the SCG failure type, the SN1 may determine the type of the SN change failure according to the above information.

Specifically, if the field of Previous SN Information includes the identifier information of the SN1, and field of Previous SN Information, the field of Failed SN Information and the field of Serving SN Information are different from each other, one of the following two conditions is satisfied:

- the message of the SCG failure reported by the UE carries the timeSCGChangeFailure, and the value of the timeSCGChangeFailure is lower than the preconfigured threshold; and
- the message of the SCG failure reported by the UE does not carry the timeSCGChangeFailure, or the value of the failureType in the message is scg-ChangeFailure.

Optionally, the SN1 determines that the SN to which the UE connects before the SN change is the SN1 according to the received UE history information or the received SN information, determines that the SN where the SCG failure occurs is the SN2 according to the information of the SN before the SN to which the UE currently connects in the received UE history information or the received SN information, and determines that the SN to which the UE currently connects is the SN3 according to the information of the SN to which the UE currently connects in the received UE history information or the received SN information. In addition, the value of the time length of the connection between the UE and the SN in the received UE history information or the received SN information is lower than the preconfigured threshold.

The SN1 is associated with the configuration parameters in the SN1 for determining the SN change with the SN mobility information. According to the above information, the SN1 determines that the type of this SN change failure is "SN Change to wrong cell".

If the signaling includes the information of SCG Failure Type that indicates the SCG failure type, the SN1 may use this information as its own determination, or the SN1 may determine the type of the SN change failure by itself according to the above method.

The SN1 may determine the reason why the SN change fails according to the above information, adjust the parameter configuration information corresponding to the initiation of the SN change according to the reason, and optimize the mechanism of deciding to initiate the SN change process.

FIG. 7 is a schematic diagram of a fifth embodiment of the present disclosure. The fifth embodiment refers to the following specific scenario of the first embodiment: the UE has connected to the MN. The UE is configured to add a secondary node SN1. The SN1 decides to initiate the SN change process and change the secondary node to an SN2. The SCG failure of the UE on the SN2 occurs within a short time after the success, or the SCG failure occurs in the SN change process. The UE is configured to add a secondary node SN3. The MN is an eNB. The SN1, the SN2, and the SN3 may be an en-gNB or eNB.

The fifth embodiment shown in FIG. 7 includes the following steps:

In step 701, the MN sends an X2 signaling secondary node addition request (SGNB ADDITION REQUEST) to the SN1, to require the SN1 to configure a resource for the UE. The signaling carries evolved radio bearer (E-RAB) information that needs to be configured on the SN1. For example, the E-RAB information includes an E-RAB identifier and an E-RAB quality requirement. The signaling may further carry SCG configuration information and the SCG configuration information includes capability information of the UE.

In step 702, after receiving the signaling described in the previous step, the SN1 allocates the resource as required by the signaling. The SN1 sends an X2 signaling secondary node addition response (SGNB ADDITION REQUEST ACKNOWLEDGE) to the MN, to notify the MN of the received evolved radio bearer (E-RAB) information. The signaling may carry new SCG configuration information provided by the SN1 and sent to the MN through an RRC container, and the MN sends the SCG configuration information to the UE through an RRC message. The signaling may also carry field information SN Mobility Information. The information (which corresponds to a set of configuration parameters for an SN handover) is generated by the SN1, and is a digital identifier associated with a configuration parameter used to decide the SN change. The SN provides this information to the MN for the purpose of a later analysis on the cause of a wrong SN handover. For example, the SN sends the information to the MN, and the MN saves the information. If the MN receives a message of the SN failure reported by the UE, the MN may send the information to the SN. The SN may determine which parameter/parameters are needed to be adjusted, according to the report information of the UE and the configuration information corresponding to the SN mobility information. The MN adds the information of the SN1 to the UE history information saved by the MN, to use the information as the information of an SN to which the UE currently connects. The information of the SN1 may be the SN identifier information of the SN1, and/or the time length of the connection between the UE and the SN, and/or the reason why the SN of the UE is configured as the SN1. The SN identifier information includes a PSCell ID. Optionally, the SN identifier information may also include a node ID. Optionally, the MN may save the information of the SN1 as a separate information part, rather than add the information to the UE history information.

In step 703, the SN1 sends an X2 signaling secondary node change requirement (SGNB CHANGE REQUIRED) to the MN, to notify the MN to change the SN of the UE to the SN2. The information carries the node identifier information of the SN2, and may further carry newest SCG configuration information. The signaling may further carry field information SN Mobility Information. The information is used to indicate the set of configuration parameters related to the SN handover, as shown in step 702. The MN determines that this SN change process is triggered by the SN1, and saves this information.

In step 704, the MN sends an X2 signaling secondary node addition request (SGNB ADDITION REQUEST) to the SN2, to require the SN2 to configure a resource for the UE.

In step 705, after receiving the signaling described in the previous step, the SN2 allocates the resource as required by the signaling. The SN2 sends an X2 signaling secondary node addition response (SGNB ADDITION REQUEST ACKNOWLEDGE) to the MN.

The MN adds the information of the SN2 to the UE history information saved by the MN, to use the information as the information of an SN to which the UE currently connects. The information of the SN2 may be the SN identifier information of the SN2, and/or the time length of the connection between the UE and the SN, and/or the reason why the SN of the UE is configured as the SN2. The SN identifier information includes a PSCell ID. Optionally, the SN identifier information may also include a node ID. Optionally, the MN may save the information of the SN2 as a separate information part, rather than add the information to the UE history information.

In step 706, the MN sends an X2 signaling secondary node change confirmation (SGNB CHANGE CONFIRM) to the SN1. The SN1 stops sending data to the UE after receiving the signaling.

In step 707, the MN sends an X2 signaling UE context release to the SN1. The SN1 releases the UE context and the resource of the UE context, after receiving the signaling.

The SCG failure of the UE occurs on the SN2 within a short time after the success of the SN change process. Optionally, the SCG failure occurs in the SN change process.

In step 708, the UE sends to the MN an EUTRAN RRC message NR as secondary cell group failure information (SCGFailureInformationNR).

When detecting the SCG failure, the UE reports the message of the SCG failure to the MN.

If the SCG failure occurs after the SN change is successful, the message SCGFailureInformationNR may carry: the identifier information (Previous PSCell Id) of a PSCell to which an SN, to which the UE successfully connects before the SN change, belongs; and/or the identifier information (Failed PSCell Id) of a PSCell, to which the SN where the SCG failure occurs, belongs; and/or the time length (timeSCGChangeFailure) between a previous successful SN change and the SCG failure event. If the SN2 is an eNB, the UE sends an EUTRAN RRC message secondary cell group failure information (SCGFailureInformation) to the MN. The message may carry: the identifier information (Previous PSCell Id) of the PSCell to which the SN, to which the UE successfully connects before the SN change, belongs; and/or the identifier information (Failed PSCell Id) of the PSCell, to which the SN where the SCG failure occurs, belongs; and/or the time length (timeSCGChangeFailure) between the previous successful SN change and the SCG failure event.

If the SCG failure occurs in the SN change process, the message SCGFailureInformationNR may carry: the identifier information (Previous PSCell Id) of the PSCell, to which the SN to which the UE successfully connects before the SN change, belongs; and/or the identifier information (Failed PSCell Id) of the PSCell, to which the SN where the SCG failure occurs, belongs. The value of the subfield failureType-r15 of the field FailureReportSCG-NR-r15 carried in the message may be set to scg-ChangeFailure. If the SN2 is an eNB, the UE sends an EUTRAN RRC message SCGFailureInformation. The message may carry: the identifier information (Previous PSCell Id) of the PSCell to which the SN, to which the UE successfully connects before the SN change, belongs; and/or the identifier information (Failed PSCell Id) of the PSCell, to which the SN where the SCG failure occurs, belongs.

According to the time when the SN to which the UE currently connects in the UE history message saved by the MN is set to the SN2 and the time when the MN receives the message of the SCG failure sent by the UE, the MN updates the time length of the connection between the UE and the SN in the information of the SN2 in the UE history message saved by the MN.

After step 708, the MN may send a secondary node release request message to notify the SN2 to release the UE context.

The MN may determine the reason/type of the SN change failure according to the information received in step 708 and the information saved by the MN. For the method, reference is made to the description in the fourth embodiment.

In step 709, the MN sends an X2 signaling secondary node addition request (SGNB ADDITION REQUEST) to the SN3.

When receiving the report message of the SCG failure, the MN selects a new SN for the UE according to the measurement report sent by the UE. The MN sends a secondary node establishment request message to the new SN. The signaling may carry one or more of the following information:

UE history information, which may include the identifier information of an SN to which the UE ever connects, and/or the time length of the connection between the UE and the SN, and/or the reason for changing the SN, and SN information, the SN information including the identifier information the SN to which the UE ever connects, and/or the time length of the connection between the UE and the SN, and/or the reason for changing the SN.

The identifier information of the SN includes the PSCell ID of a cell to which the SN belongs. Optionally, the identifier information of the SN may further include the node ID of the SN.

In step 710, the SN3 sends an X2 signaling secondary node addition response (SGNB ADDITION REQUEST ACKNOWLEDGE) to the MN. The MN adds the information of SN3 to the UE history information saved by the MN, to use the information as the information of the SN to which the UE currently connects. The information of the SN3 may be the SN identifier information of the SN3, and/or the time length of the connection between the UE and the SN, and/or the reason why the SN of the UE is configured as the SN3. The identifier information of the SN includes a PSCell ID. Optionally, the identifier information of the SN may also include a node ID. Optionally, the MN may save the information of the SN3 as a separate information part, rather than add the information to the UE history information.

The MN may know that this SN change process is triggered by the SN1, according to the foregoing saved information. Therefore, the MN notifies the SN1 of the relevant information of the SCG failure.

In step 711, the MN sends an X2 signaling to the SN1 to notify the information of the SN failure. The signaling may be an X2 signaling radio link failure indication (RLF INDICATION), or an X2 signaling handover report, or a newly defined signaling.

Step 711 may be performed at any time after step 708.

If step 707 has not been performed when it is necessary to perform step 711, the signaling may also be an X2 signaling UE context release.

The signaling may include the following one or more pieces of information:

Field information SN Mobility Information carried in step 702 or step 703.

Identifier information (Previous SN Information) of the SN to which the UE successfully connects before the SN change.

Identifier information (Failed SN Information) of the SN where the SCG failure occurs.

Identifier information (Serving SN Information) of an SN that is reconfigured by the MN for the UE and to which the UE successfully connects, after the UE reports the SCG failure.

The above SN identifier information includes the PSCell ID of a cell to which the SN belongs. Optionally, the SN identifier information may further include the node ID of the SN.

RRC message secondary cell group failure information received in step 708.

Information SCG Failure Type indicating the type of the SCG change failure determined by the MN, of which the value may be "SN change too late", "SN change too early" and "SN change to wrong cell". For example, if the MN determines that the type of this SN change failure is "SN change to wrong cell", the value of the SCG Failure Type may be "SN change to wrong cell".

UE history information, which may include SN information, for example, the identifier information of the SN to which the UE ever connects, and/or the time length of the connection between the UE and the SN, and/or the reason for changing the SN.

Separate SN information, the SN information including the identifier information of the SN to which the UE ever connects, and/or the time length of the connection between the UE and the SN, and/or the reason for changing the SN.

Indication of whether the SCG failure occurs in or after the SN change process. The indication may also be a type of an SCG error, for example, an SCG radio link error, or an SCG change error.

After receiving the signaling in step 711, if the signaling does not include the field information SCG Failure Type indicating the SCG failure type, the SN1 may determine the type of the SN change failure according to the above information. For the method, reference is made to the description in the fourth embodiment.

If the signaling includes the information SCG Failure Type that indicates the SCG failure type, the SN1 may use this information as its own determination, or the SN1 may determine the type of the SN change failure by itself according to the above method.

The SN1 may determine the reason why the SN change fails according to the above information, adjust the parameter configuration information corresponding to the initiation of the SN change according to the reason, and optimize the mechanism of deciding to initiate the SN change process.

FIG. 8 is a schematic diagram of a sixth embodiment of the present disclosure. The sixth embodiment refers to the following specific scenario of the second embodiment: the UE has connected to the MN. The UE is configured to add a secondary node SN1. The MN decides to initiate the SN change process and change the secondary node to an SN2. The SCG failure of the UE on the SN2 occurs within a short time after the success of the SN change, or the SCG failure occurs in the SN change process. The UE is configured to add a secondary node SN3. The MN, the SN1, the SN2, and the SN3 may be a gNB.

The sixth embodiment shown in FIG. 8 includes the following steps:

In step 801, the MN sends an Xn signaling secondary node addition request (S-NODE ADDITION REQUEST) to the SN1, to require the SN1 to configure a resource for the UE. The signaling carries PDU session information that needs to be configured on the SN1, and may further carry SCG configuration information.

In step 802, after receiving the signaling described in the previous step, the SN1 allocates the resource as required by the signaling. The SN1 sends an Xn signaling secondary node addition response (S-NODE ADDITION REQUEST ACKNOWLEDGE) to the MN, to notify the MN of the received PDU session information. The signaling may carry new SCG configuration information provided by the SN1. The MN adds the information of the SN1 to the UE history information saved by the MN, to use the information as the information of an SN to which the UE currently connects. The information of the SN1 may be the SN identifier information of the SN1, and/or the time length of the connection between the UE and the SN, and/or the reason why the SN of the UE is configured as the SN1. The SN identifier information includes a PSCell ID. Optionally, the SN identifier information may also include a node ID. Optionally, the MN may save the information of the SN1 as a separate information part, rather than add the information to the UE history information.

The MN decides to initiate the SN change process and change the SN of the UE from the SN1 to the SN2. This SN change process is triggered by the MN, and the MN saves the information.

In step 803, the MN sends an Xn signaling secondary node addition request (S-NODE ADDITION REQUEST) to the SN2.

In step 804, the SN2 sends an Xn signaling secondary node addition response (S-NODE ADDITION REQUEST ACKNOWLEDGE) to the MN. The MN adds the information of the SN2 to the UE history information saved by the MN, to use the information as the information of an SN to which the UE currently connects. The information of the SN2 may be the SN identifier information of the SN2, and/or the time length of the connection between the UE and the SN, and/or the reason why the SN of the UE is configured as the SN2. The SN identifier information includes a PSCell ID. Optionally, the SN identifier information may also include a node ID. Optionally, the MN may save the information of the SN2 as a separate information part, rather than add the information to the UE history information.

In step 805, the MN sends an Xn signaling secondary node release request (S-NODE RELEASE REQUEST) to the SN1, to notify the SN1 to release a resource related to the UE.

In step 806, the SN1 stops sending data to the UE after receiving the signaling in the previous step. The SN1 sends an Xn signaling secondary node release response (S-NODE RELEASE REQUEST ACKNOWLEDGE) to the MN.

In step 807, the MN sends an Xn signaling UE context release to the SN1. The SN1 releases the UE context and the resource of the UE context, after receiving the signaling.

The SCG failure of the UE occurs on the SN2 within a short time after the success of the SN change process. Optionally, the SCG failure occurs in the SN change process.

In step 808, the UE sends an NR RRC message secondary cell group failure information (SCGFailureInformation) to the MN.

When detecting the SCG failure, the UE reports the message of the SCG failure to the MN.

If the SCG failure occurs after the SN change is successful, the message SCGFailureInformation may carry the identifier information (Previous PSCell Id) of a PSCell to which an SN to which the UE successfully connects before the SN change belongs, and/or the identifier information (Failed PSCell Id) of a PSCell to which the SN where the SCG failure occurs belongs, and/or the time length (timeSCGChangeFailure) between a previous successful SN change and the SCG failure event.

If the SCG failure occurs in the SN change process, the message SCGFailureInformation may carry: the identifier information (Previous PSCell Id) of the PSCell, to which the SN to which the UE successfully connects before the SN change, belongs; and/or the identifier information (Failed PSCell Id) of the PSCell, to which the SN where the SCG failure occurs, belongs. The value of the subfield failureType of the field FailureReportSCG carried in the message may be set to scg-ChangeFailure.

According to the time when the SN to which the UE currently connects in the UE history message saved by the MN is set to the SN2 and the time when the MN receives the message of the SCG failure sent by the UE, the MN updates the time length of the connection between the UE and the SN in the information of the SN2 in the UE history message saved by the MN.

The MN may determine the type of the SN change failure according to the above information.

Specifically, according to the Previous PSCell ID and the Failed PSCell Id, the MN determines that the SN to which the UE connects before the SN change is the SN1 and the SN where the SCG failure occurs is the SN2. The MN selects a new SN for the UE according to the measurement report carried in the message of the SCG failure reported by the UE. In this embodiment, the new SN is the SN3. One of the following two conditions is satisfied: the message of the SCG failure reported by the UE carries the timeSCGChangeFailure, and the value of the timeSCGChangeFailure is lower than a preconfigured threshold; and the message of the SCG failure reported by the UE does not carry the timeSCGChangeFailure, or the value of the failureType in the message is scg-ChangeFailure. According to the above information, the MN determines that the type of this SN change failure is the type of "change to the wrong secondary node (SN Change to wrong cell)".

Optionally, the MN determines that the SN to which the UE connects before the SN change is the SN1 according to the information of the SN before the SN to which the UE currently connects in the saved UE history information, and determines that the SN where the SCG failure occurs is the SN2 according to the information of the SN to which the UE currently connects in the saved UE history information. The MN selects a new SN for the UE according to the measurement report carried in the message of the SCG failure reported by the UE. In this embodiment, the new SN is the SN3. In addition, the value of the time length of the connection between the UE and the SN in the UE history information saved by the MN is lower than a preconfigured threshold. According to the above information, the MN determines that the type of this SN change failure is the type of "change to the wrong secondary node (SN Change to wrong cell)".

The MN may configure the UE to add the secondary node SN3.

The MN may know that this SN change process is triggered by the MN, according to the foregoing saved information. Therefore, the MN does not need to notify other SNs of the relevant information of the SCG failure.

The MN may determine the reason why the SN change fails according to the above information, adjust the parameter configuration information corresponding to the initiation of the SN change according to the reason, and optimize the mechanism of deciding to initiate the SN change process.

FIG. 9 is a schematic diagram of a seventh embodiment of the present disclosure. The seventh embodiment refers to the following specific scenario of the second embodiment: the UE has connected to the MN. The UE is configured to add a secondary node SN1. The SN1 decides to initiate the SN change process and change the secondary node to an SN2. The SCG failure of the UE on the SN2 occurs within a short time after the success of the SN change, or the SCG failure occurs in the SN change process. The UE is configured to add a secondary node SN3. The MN is an eNB. The SN1, the SN2, and the SN3 may be an en-gNB.

The seventh embodiment shown in FIG. 9 includes the following steps:

In step 901, the MN sends an X2 signaling secondary node addition request (SGNB ADDITION REQUEST) to the SN1, to require the SN1 to configure a resource for the UE. The signaling carries evolved radio bearer (E-RAB) information that is needed to be configured on the SN1, and may further carry SCG configuration information.

In step 902, after receiving the signaling described in the previous step, the SN1 allocates the resource as required by the signaling. The SN1 sends an X2 signaling secondary node addition response (SGNB ADDITION REQUEST ACKNOWLEDGE) to the MN, to notify the MN of the received evolved radio bearer (E-RAB) information. The signaling may carry new SCG configuration information provided by the SN1. The MN adds the information of the SN1 to the UE history information saved by the MN, to use the information as the information of an SN to which the UE currently connects. The information of the SN1 may be the SN identifier information of the SN1, and/or the time length of the connection between the UE and the SN, and/or the reason why the SN of the UE is configured as the SN1. The SN identifier information includes a PSCell ID. Optionally, the SN identifier information may also include a node ID. Optionally, the MN may save the information of the SN1 as a separate information part, rather than add the information to the UE history information.

The MN decides to initiate the SN change process and change the SN of the UE from the SN1 to the SN2. This SN change process is triggered by the MN, and the MN saves the information.

In step 903, the MN sends an X2 signaling secondary node addition request (SGNB ADDITION REQUEST) to the SN2.

In step 904, the SN2 sends an X2 signaling secondary node addition response (SGNB ADDITION REQUEST ACKNOWLEDGE) to the MN. The MN adds the information of the SN2 to the UE history information saved by the MN, to use the information as the information of an SN to which the UE currently connects. The information of the SN2 may be the SN identifier information of the SN2, and/or the time length of the connection between the UE and the SN, and/or the reason why the SN of the UE is configured as the SN2. The SN identifier information includes a PSCell ID. Optionally, the SN identifier information may also include a node ID. Optionally, the MN may save the information of the SN2 as a separate information part, rather than add the information to the UE history information.

In step 905, the MN sends an X2 signaling secondary node release request (SGNB RELEASE REQUEST) to the SN1, to notify the SN1 to release a resource related to the UE.

In step 906, the SN1 stops sending data to the UE after receiving the signaling in the previous step. The SN1 sends an X2 signaling secondary node release response (SGNB RELEASE REQUEST ACKNOWLEDGE) to the MN.

In step 907, the MN sends an X2 signaling UE context release to the SN1. The SN1 releases the UE context and the resource of the UE context, after receiving the signaling.

The SCG failure of the UE occurs on the SN2 within a short time after the success of the SN change process. Optionally, the SCG failure occurs in the SN change process.

In step 908, the UE sends an EUTRAN RRC message secondary cell group failure information (SCGFailureInformationNR) to the MN.

When detecting the SCG failure, the UE reports the message of the SCG failure to the MN.

If the SCG failure occurs after the SN change is successful, the message SCGFailureInformationNR may carry: the identifier information (Previous PSCell Id) of a PSCell, to which an SN to which the UE successfully connects before the SN change, belongs; and/or the identifier information (Failed PSCell Id) of a PSCell to which the SN where the SCG failure occurs belongs; and/or the time length (timeSCGChangeFailure) between a previous successful SN change and the SCG failure event.

If the SCG failure occurs in the SN change process, the message SCGFailureInformationNR may carry: the identifier information (Previous PSCell Id) of the PSCell to which the SN, to which the UE successfully connects before the SN change, belongs; and/or the identifier information (Failed PSCell Id) of the PSCell to which the SN where the SCG failure occurs belongs. The value of the subfield failureType-r15 of the field of FailureReportSCG-NR-r15 carried in the message may be set to scg-ChangeFailure.

According to the time when the SN to which the UE currently connects in the UE history message saved by the MN is set to the SN2 and the time when the MN receives the message of the SCG failure sent by the UE, the MN updates the time length of the connection between the UE and the SN in the information of the SN2 in the UE history message saved by the MN.

The MN may determine the type of the SN change failure according to above the information. For the method, reference is made to the description in the sixth embodiment.

The MN may configure the UE to add the secondary node SN3.

The MN may know that this SN change process is triggered by the MN, according to the foregoing saved information. Therefore, the MN does not need to notify other SNs of the relevant information of the SCG failure.

The MN may determine the reason for the SN change failure according to the above information, adjust the parameter configuration information corresponding to the initiation of the SN change according to the reason, and optimize the mechanism of deciding to initiate the SN change process.

FIG. 10 is a schematic diagram of an eighth embodiment of the present disclosure. The eighth embodiment refers to the following specific scenario of the third embodiment: the UE has connected to the MN. The UE is configured to add a secondary node SN1. The SCG failure of the UE occurs on the SN1. The UE is configured to add a secondary node SN2. The MN, the SN1 and the SN2 are respectively a gNB.

The eighth embodiment shown in FIG. 10 includes the following steps:

In step 1001, the MN sends an Xn signaling secondary node addition request (S-NODE ADDITION REQUEST) to the SN1, to require the SN1 to configure a resource for the UE. The signaling carries PDU session information that is needed to be configured on the SN1. For example, the PDU session information includes the identifier of a PDU session, the identifier of a QoS flow included in the session, and a quality requirement of the QoS flow. The signaling may further carry SCG configuration information, and the SCG configuration information includes capability information of the UE.

In step 1002, after receiving the signaling described in the previous step, the SN1 allocates the resource as required by the signaling. The SN1 sends an Xn signaling secondary node addition response (S-NODE ADDITION REQUEST ACKNOWLEDGE) to the MN, to notify the MN of the received PDU session information. The signaling may carry new SCG configuration information provided by the SN1 and sent to the MN through an RRC container, and the MN sends the SCG configuration information to the UE through an RRC message. The signaling may also carry the information SN Mobility Information. The information (which corresponds to a set of configuration parameters for an SN handover) is generated by the SN1, and is a digital identifier associated with a configuration parameter used to decide the SN change. The SN provides this information to the MN for the purpose of a later analysis on the cause of a wrong SN handover. For example, the SN sends the information to the MN, and the MN saves the information. If the MN receives a message of the SN failure reported by the UE, the MN may send the information to the SN. The SN may determine which parameter/parameters need to be adjusted, according to the report information of the UE and the configuration information corresponding to the SN mobility information. The MN adds the information of the SN1 to the UE history information saved by the MN, to use the information as the information of an SN to which the UE currently connects. The information of the SN1 may be the SN identifier information of the SN1, and/or the time length of the connection between the UE and the SN, and/or the reason why the SN of the UE is configured as the SN1. The SN identifier information includes a PSCell ID. Optionally, the SN identifier information may also include a node ID. Optionally, the MN may save the information of the SN1 as a separate information part, rather than add the information to the UE history information.

In step 1003, the SCG failure of the UE occurs on the SN1. The UE sends an NR RRC message SCG failure information (SCGFailureInformation) to the MN.

When detecting the SCG failure, the UE reports the message of the SCG failure to the MN. The message may include one or more of the following information:

Identifier information (Failed PSCell Id) of a PSCell to which the SN where the SCG failure occurs belongs;
C-RNTI assigned by the SN1 for the UE;
C-RNTI assigned by the MN for the UE.

According to the time when the SN to which the UE currently connects in the UE history message saved by the MN is set to the SN1 and the time when the MN receives the message of the SCG failure sent by the UE, the MN updates the time length of the connection between the UE and the SN in the information of the SN1 in the UE history message saved by the MN.

The MN may determine the type of the SN change failure according to the above information.

Specifically, according to the Failed PSCell Id, the MN determines that the SN where the SCG failure occurs is the SN1. The MN selects a new SN for the UE according to the measurement report carried in the message of the SCG failure reported by the UE. In this embodiment, the new SN is the SN2. No SN change process occurs before the SCG occurs. Accordingly, the MN determines that the type of this SN change failure is "SN change too late".

Optionally, the MN determines that the SN where the SCG failure occurs is the SN1 according to the information of the SN to which the UE currently connects in the saved UE history information. The MN selects a new SN for the UE according to the measurement report carried in the message of the SCG failure reported by the UE. In this embodiment, the new SN is the SN2. In addition, the time length of the connection between the UE and the SN in the UE history information saved by the MN is large. According to the above information, the MN determines that the type of this SN change failure is "SN change too late".

The MN may determine the reason for the SN change failure according to the above information, adjust the parameter configuration information corresponding to the initiation of the SN change according to the reason, and optimize the mechanism of deciding to initiate the SN change process. However, the MN cannot determine whether the SN change process that should occur should be triggered by the SN1 or the MN. Therefore, the MN needs to send related information to the SN1 (see step 1006, step 1008, or step 1009).

In step 1004, the MN sends an Xn signaling secondary node addition request (S-NODE ADDITION REQUEST) to the SN2, to require the SN1 to configure a resource for the UE. The signaling carries the PDU session information that needs to be configured on the SN1, and may further carry the SCG configuration information.

In step 1005, after receiving the signaling described in the previous step, the SN2 allocates the resource as required by the signaling. The SN2 sends an Xn signaling secondary node addition response (S-NODE ADDITION REQUEST ACKNOWLEDGE) to the MN, to notify the MN of the received PDU session information. The signaling may carry new SCG configuration information provided by the SN2.

The MN adds the information of the SN2 to the UE history information saved by the MN, to use the information as the information of an SN to which the UE currently connects. The information of the SN2 may be the SN identifier information of the SN2, and/or the time length of the connection between the UE and the SN, and/or the reason why the SN of the UE is configured as the SN2. The SN identifier information includes a PSCell ID. Optionally, the SN identifier information may also include a node ID. Optionally, the MN may save the information of the SN2 as a separate information part, rather than add the information to the UE history information.

In step 1006, the MN sends an Xn signaling secondary node release request (S-NODE RELEASE REQUEST) to the SN1, to notify the SN1 to release a resource related to the UE.

The signaling may include the following one or more pieces of information:

Identifier of the UE on an Xn, which may include the identifier on the Xn interface assigned by the MN and/or the SN for the UE.
Information of the PDU to be released, for example, the identifier of the PDU session.
Identifier information (Serving SN Information) of an SN that is reconfigured by the MN for the UE and to which the UE successfully connects, after the UE reports the SCG failure. The identifier information of the SN includes a PECell ID, and may include a node ID and/or the PSCell ID.
RRC message received in step 1001.
Information SCG Failure Type, of which the value is "SN change too late" and which indicates the type of the SCG change failure determined by the MN, where the value of the SCG Failure Type may be "SN change too late", "SN change too early" and "SN change to wrong cell". For example, if the MN determines that the type of this SN change failure is "SN change too late", the value of the SCG Failure Type may be "SN change too late".
Information SN Mobility Information carried in step 1002.
UE identifier assigned by the SN1, which may be a C-RNTI and/or an identifier on the Xn interface that is assigned by the SN1 for the UE.
UE history information, which may include SN information, for example, the identifier information of an SN to which the UE ever connects, and/or the time length of the connection between the UE and the SN, and/or the reason for changing the SN.
Separate SN information, the SN information including the identifier information of the SN to which the UE ever connects, and/or the time length of the connection between the UE and the SN, and/or the reason for changing the SN.

In step 1007, the SN1 sends an Xn signaling secondary node release response (S-NODE RELEASE REQUEST ACKNOWLEDGE) to the MN.

In step 1008, the MN sends an Xn signaling UE context release to the SN1. The SN1 releases the UE context and the resource of the UE context, after receiving the signaling.

The signaling may include the following one or more pieces of information:

Identifier of the UE on the Xn, which may include the identifier on the Xn interface assigned by the MN and/or the SN for the UE.
Identifier information (Serving SN Information) of the SN that is reconfigured by the MN for the UE and to which the UE successfully connects, after the UE reports the SCG failure. The identifier information of the SN includes the PECell ID of a cell to which the SN belongs. Optionally, the identifier information may include the node ID of the SN.

RRC message secondary cell group failure information received in step 1001.

Information SCG Failure Type, of which the value is "SN change too late" and which indicates the type of the SCG change failure determined by the MN, where the value of the SCG Failure Type may be "SN change too late", "SN change too early" and "SN change to wrong cell". For example, if the MN determines that the type of this SN change failure is "SN change too late", the value of the SCG Failure Type may be "SN change too late".

Information SN Mobility Information carried in step 1002.

UE identifier assigned by the SN1, which may be the C-RNTI and/or the identifier on the Xn interface that is assigned by the SN1 for the UE.

UE history information, which may include the SN information, for example, the identifier information of the SN to which the UE ever connects, and/or the time length of the connection between the UE and the SN, and/or the reason for changing the SN.

Separate SN information, the SN information including the identifier information of the SN to which the UE ever connects, and/or the time length of the connection between the UE and the SN, and/or the reason for changing the SN.

In step 1009, the MN may further send an Xn signaling Failure Indication, an Xn signaling HANDOVER Report or a newly defined Xn signaling to the SN1. The signaling is used to inform the SN1 of that the MN receives the report of the SCG failure sent by the UE, and notify the SN1 of the information related to the SN failure. The signaling may include the following one or more pieces of information:

Identifier information (Serving SN Information) of the SN that is reconfigured by the MN for the UE and to which the UE successfully connects, after the UE reports the SCG failure. The identifier information of the SN includes the PSCell ID of the cell to which the SN belongs. Optionally, the identifier information may include the node ID of the SN.

RRC message received in step 1001.

Information SCG Failure Type, of which the value is "SN change too late" and which indicates the type of the SCG change failure determined by the MN, where the value of the SCG Failure Type may be "SN change too late", "SN change too early" and "SN change to wrong cell". For example, if the MN determines that the type of this SN change failure is "SN change too late", the value of the SCG Failure Type may be "change too late".

Information SN Mobility Information carried in step 1002.

UE identifier assigned by the SN1, which may be the C-RNTI and/or the identifier on the Xn interface that is assigned by the SN1 for the UE.

UE history information, which may include the SN information, for example, the identifier information of the SN to which the UE ever connects, and/or the time length of the connection between the UE and the SN, and/or the reason for changing the SN.

Separate SN information, the SN information including the identifier information of the SN to which the UE ever connects, and/or the time length of the connection between the UE and the SN, and/or the reason for changing the SN.

After receiving the one or more pieces of information described in step 1006, step 1008 or step 1009, if the signaling does not include the field information SCG Failure Type, the SN1 may determine the type of the SN change failure according to the above information.

Specifically, the SN1 determines that the SN where the SCG failure occurs is the SN1 according to the Failed PSCell ID carried in the RRC message. The new SN configured by the MN for the UE is the SN2 according to the Serving SN Information. No SN change process occurs before the SCG occurs. Accordingly, the SN1 determines that the type of this SN change failure is "SN change too late".

Optionally, the SN1 determines that the SN where the SCG failure occurs is the SN1 according to the received UE history information or the received SN information, and determines that the SN to which the UE currently connects is the SN2 according to the SN to which the UE currently connects in the received UE history information or the received SN information. In addition, in the UE history information or in the SN information received by the SN1, the time length of the connection between the UE and the SN in the information of the SN1 is large. Accordingly, the SN1 determines that the type of this SN change failure is "SN change too late".

If the signaling includes the information SCG Failure Type, the SN1 may use this information as its own determination, or the SN1 may determine the type of the SN change failure by itself according to the above method.

The SN1 may determine the reason why the SN change fails according to the above information, find out the parameter configuration information corresponding to the SN change according to the SN mobility information and/or the UE identifier assigned by the SN1, adjust the parameter configuration information corresponding to the initiation of the SN change according to the reason, and optimize the mechanism of deciding to initiate the SN change process.

FIG. 11 is a schematic diagram of a ninth embodiment of the present disclosure. The ninth embodiment refers to the following specific scenario of the third embodiment: the UE has connected to the MN. The UE is configured to add a secondary node SN1. The SCG failure of the UE occurs on the SN1. The UE is configured to add a secondary node SN2. The MN is an eNB, and the SN1 and the SN2 are respectively an en-gNB.

The ninth embodiment shown in FIG. 11 includes the following steps:

In step 1101, the MN sends an X2 signaling secondary node addition request (SGNB ADDITION REQUEST) to the SN1, to require the SN1 to configure a resource for the UE. The signaling carries evolved radio bearer (E-RAB) information that needs to be configured on the SN1. For example, the E-RAB information includes an E-RAB identifier and an E-RAB quality requirement. The signaling may further carry SCG configuration information and the SCG configuration information includes capability information of the UE.

In step 1102, after receiving the signaling described in the previous step, the SN1 allocates the resource as required by the signaling. The SN1 sends an X2 signaling secondary node addition response (SGNB ADDITION REQUEST ACKNOWLEDGE) to the MN, to notify the MN of the received evolved radio bearer (E-RAB) information. The signaling may carry new SCG configuration information provided by the SN1 and the new SCG configuration information is sent to the MN through an RRC container, and the MN sends the SCG configuration information to the UE through an RRC message. The signaling may also carry information of SN Mobility Information. The information (which corresponds to a set of configuration parameters for an SN handover) is generated by the SN1, and is a digital identifier associated with a configuration parameter used to decide the SN change. The SN provides this information to the MN for purpose of a later analysis as to why the wrong SN handover incurred. For example, the SN sends the information to the MN, and the MN saves the information. If the MN receives a message of the SN failure reported by the UE, the MN may send the information to the SN. The SN may determine which parameter/parameters are needed to be adjusted, according to the report information of the UE and the configuration information corresponding to the SN mobility information. The MN adds the information of the SN1 to the UE history information saved by the MN, to use the information as the information of an SN to which the UE currently connects. The information of the SN1 may be the SN identifier information of the SN1, and/or the time length of the connection between the UE and the SN, and/or the reason why the SN of the UE is configured as the SN1. The SN identifier information includes a PSCell ID. Optionally, the SN identifier information may also include a node ID. Optionally, the MN may save the information of the SN1 as a separate information part, rather than add the information to the UE history information.

In step 1103, the SCG failure of the UE occurs on the SN1. The UE sends an EUTRAN RRC message SCG failure information (SCGFailureInformationNR) to the MN.

When detecting the SCG failure, the UE reports the message of the SCG failure to the MN.

The message may include one or more of the following information:
Identifier information (Failed PSCell Id) of a PSCell to which the SN where the SCG failure occurs belongs;
C-RNTI assigned by the SN1 for the UE;
C-RNTI assigned by the MN for the UE.

According to the time when the SN, to which the UE currently connects in the UE history message saved by the MN, is set to the SN1 and the time when the MN receives the message of the SCG failure sent by the UE, the MN updates the time length of the connection between the UE and the SN in the information of the SN1 in the UE history message saved by the MN.

According to the above information, the MN may determine that the type of the SN change failure is "SN change too late". For the method, reference is made to the description in the eighth embodiment.

The MN may determine the reason why the SN change fails according to the above information, adjust the parameter configuration information corresponding to the initiation of the SN change according to the reason, and optimize the mechanism of deciding to initiate the SN change process. However, the MN cannot determine whether the SN change process that should occur should be triggered by the SN1 or the MN, because the reason why the SCG fails at this time is that the initiation of "SN change is too late", which means that the MN or/and the SN do not initiate the SN change process, and the configuration parameter on the MN or/and the SN that trigger the SN change may have a problem. Therefore, the MN needs to send related information to the SN1 (see step 1106, step 1108 or step 1109).

In step 1104, the MN sends an X2 signaling secondary node addition request (SGNB ADDITION REQUEST) to the SN2, to require the SN1 to configure a resource for the UE. The signaling carries the evolved radio bearer (E-RAB) information that is needed to be configured on the SN1, and may further carry the SCG configuration information.

In step 1105, after receiving the signaling described in the previous step, the SN2 allocates the resource as required by the signaling. The SN2 sends an X2 signaling secondary node addition response (SGNB ADDITION REQUEST ACKNOWLEDGE) to the MN, to notify the MN of the received evolved radio bearer (E-RAB) information. The signaling may carry new SCG configuration information provided by the SN2. The MN adds the information of the SN2 to the UE history information saved by the MN, to use the information as the information of an SN to which the UE currently connects. The information of the SN2 may be the SN identifier information of the SN2, and/or the time length of the connection between the UE and the SN, and/or the reason why the SN of the UE is configured as the SN2. The SN identifier information includes a PSCell ID. Optionally, the SN identifier information may also include a node ID. Optionally, the MN may save the information of the SN1 as a separate information part, rather than add the information to the UE history information.

In step 1106, the MN sends an Xn signaling secondary node release request (SGNB RELEASE REQUEST) to the SN1, to notify the SN1 to release a resource related to the UE.

The signaling may include the following one or more pieces of information:
Identifier of the UE on an X2, which may include the identifier on the X2 interface assigned by the MN and/or the SN for the UE.
Information of the E-RAB bearer to be released, for example, the identifier of the E-RAB bearer.
Identifier information (Serving SN Information) of an SN that is reconfigured by the MN for the UE and to which the UE successfully connects, after the UE reports the SCG failure. The identifier information of the SN includes the PECell ID of a cell to which the SN belongs. Optionally, the identifier information may also include the node ID of the SN.
RRC message NR secondary cell group failure information received in step 1101.
Field information SCG Failure Type indicating the SCG failure type, which indicates the type of the SN change failure determined by the MN and of which the value may be "SN change too late", "SN change too early" and "SN change to wrong cell", For example, if the MN determines that the type of this SN change failure is "SN change to wrong cell", the value of the SCG Failure Type may be "SN change to wrong cell".
Information SN Mobility Information carried in step 1102.
UE identifier assigned by the SN1, which may be a C-RNTI and/or an identifier on the X2 interface that is assigned by the SN1 for the UE.
UE history information, which may include SN information, for example, the identifier information of an SN to which the UE ever connects, and/or the time length of the connection between the UE and the SN, and/or the reason for changing the SN.
Separate SN information, the SN information including the identifier information of the SN to which the UE ever connects, and/or the time length of the connection between the UE and the SN, and/or the reason for changing the SN.

In step 1107, the SN1 sends an Xn signaling SGNB RELEASE REQUEST ACKNOWLEDGE to the MN.

In step 1108, the MN sends an X2 signaling UE context release to the SN1. The SN1 releases the UE context and the resource of the UE context, after receiving the signaling.

The signaling may include the following one or more pieces of information:
- Identifier of the UE on the X2, which may include the identifier on the X2 interface assigned by the MN and/or the SN for the UE.
- Identifier information (Serving SN Information) of the SN that is reconfigured by the MN for the UE and to which the UE successfully connects, after the UE reports the SCG failure. The identifier information of the SN includes the PECell ID of the cell to which the SN belongs. Optionally, the identifier information may also include the node ID of the SN.
- RRC message NR secondary cell group failure information received in step 1101.
- Field information SCG Failure Type indicating the SCG failure type, which indicates the type of the SN change failure determined by the MN and of which the value may be "SN change too late", "SN change too early" and "SN change to wrong cell". For example, if the MN determines that the type of this SN change failure is "SN change to wrong cell", the value of the SCG Failure Type may be "SN change to wrong cell".
- Information SN Mobility Information carried in step 1102.
- UE identifier assigned by the SN1, which may be the C-RNTI and/or the identifier on the X2 interface that is assigned by the SN1 for the UE.
- UE history information, which may include the SN information, for example, the identifier information of the SN to which the UE ever connects, and/or the time length of the connection between the UE and the SN, and/or the reason for changing the SN.
- Separate SN information, the SN information including the identifier information of the SN to which the UE ever connects, and/or the time length of the connection between the UE and the SN, and/or the reason for changing the SN.

In step 1109, the MN may further send an X2 signaling failure indication (RLF INDICATION), or an X2 signaling handover report, or a newly defined signaling. The signaling may include the following one or more pieces of information:
- Identifier information (Serving SN Information) of the SN that is reconfigured by the MN for the UE and to which the UE successfully connects, after the UE reports the SCG failure. The identifier information of the SN includes the PECell ID of the cell to which the SN belongs. Optionally, the identifier information may also include the node ID of the SN.
- RRC message received in step 1101.
- Field information SCG Failure Type indicating the SCG failure type, which indicates the type of the SN change failure determined by the MN and of which the value may be "SN change too late", "SN change too early" and "SN change to wrong cell". For example, if the MN determines that the type of this SN change failure is "SN change to wrong cell", the value of the SCG Failure Type may be "SN change to wrong cell".
- Information SN Mobility Information carried in step 1102.
- UE identifier assigned by the SN1, which may be the C-RNTI and/or the identifier on the X2 interface that is assigned by the SN1 for the UE.
- UE history information, which may include the SN information, for example, the identifier information of the SN to which the UE ever connects, and/or the time length of the connection between the UE and the SN, and/or the reason for changing the SN.
- Separate SN information, the SN information including the identifier information of the SN to which the UE ever connects, and/or the time length of the connection between the UE and the SN, and/or the reason for changing the SN.

After receiving the one or more pieces of information described in step 1106, step 1108 or step 1109, if the signaling does not include the field information SCG Failure Type, the SN1 may determine that the type of the SN change failure is "SN change too late" according to the above information. For the method, reference is made to the description in the eighth embodiment.

If the signaling includes the information SCG Failure Type that indicates the SCG failure type, the SN1 may use this information as its own determination, or the SN1 may determine the type of the SN change failure by itself according to the above method.

The SN1 may determine the reason why the SN change fails according to the above information, find out the parameter configuration information corresponding to the SN change according to the SN Mobility Information and/or the UE identifier assigned by the SN1, adjust the parameter configuration information corresponding to the initiation of the SN change according to the reason, and optimize the mechanism of deciding to initiate the SN change process.

According to a third implementation of the present disclosure, when successfully connecting to a target secondary node, a UE sends a report message about a secondary cell group (SCG) success to an MN.

Optionally, a new EUTRAN RRC message SuccessfulSCGChangeReport is added as a report message. The message may include the PSCell ID of a cell to which a connected SN belongs, and a signal quality RSRP and/or RSRQ and/or SINR of the cell. Optionally, a new NR RRC message SuccessfulSCGChangeReport is added as a report message. The message may include the PSCell ID of the connected SN and a beam-related signal quality RSRP and/or RSRQ and/or SINR.

FIG. 12 is a schematic diagram of a tenth embodiment of the present disclosure, and describes the following scenario:

A first node UE sends an NR RRC message successful secondary cell group change report (SuccessfulSCGChangeReport) or an EUTRAN RRC message successful secondary cell group change report (SuccessfulSCGChangeReport) to a second node. The second node may be an access node such as an MN or an SN. The MN or the SN may be a gNB, or may be an eNB or an ng-eNB.

After successfully performing an SN change process, the UE generates information Successful SCGChange Report. The information includes a parameter related to an SN change, for example, a configuration parameter and a measurement result of the UE itself. The UE sends the information to the second node. The second node may optimize the mechanism of the decision of the generated SN change according to the information.

Specifically, in step 1201, if the second node is a gNB, the first node sends the NR RRC message SuccessfulSCGChangeReport to the second node. The message may carry the PSCell ID of the SN to which the UE connects, and the beam-related signal quality RSRP and/or RSRQ and/or SINR. If the second node is an eNB or an ng-eNB, the first node sends the EUTRAN RRC message SuccessfulSCGChangeReport to the second node. The message may carry the PSCell ID of the SN to which the UE connects, and the signal quality RSRP and/or RSRQ and/or SINR.

According to a fourth implementation of the present disclosure, at least one of the following information is recorded in an Xn message or an X2 message: the identifier information of each secondary node to which the UE ever connects, the time length of the connection between the UE and the each secondary node, and the reason for each secondary node handover.

Optionally, the identifier information of an SN to which the UE ever connects, and/or the time length of the connection between the UE and the SN, and/or the reason for changing the SN is added to the existing Xn information UE History Information. New information UE History Information may be added to the existing Xn message. The Xn message may be a secondary node addition request (S-NODE ADDITION REQUEST) or a UE context release. Optionally, new information SN information is added to the Xn message. The SN information includes the identifier information of the SN to which the UE ever connects, and/or the time length of the connection between the UE and the SN, and/or the reason for changing the SN. The identifier information of the SN may be a node ID and/or a PSCell ID. The Xn message may be the secondary node addition request (S-NODE ADDITION REQUEST), the UE context release, or a handover request.

Optionally, the identifier information of the SN to which the UE ever connects, and/or the time length of the connection between the UE and the SN, and/or the reason for changing the SN is added to the existing X2 information UE History Information. New information UE History Information is added to the existing X2 message. The Xn message may be a secondary node addition request (SGNB ADDITION REQUEST) or the UE context release. Optionally, new information SN information is added to the X2 message. The SN information includes the identifier information of the SN to which the UE ever connects, and/or the time length of the connection between the UE and the SN, and/or the reason for changing the SN. The identifier information of the SN may be the node ID and/or the PSCell ID. The X2 message may be the secondary node addition request (SGNB ADDITION REQUEST), the UE context release, or a handover request.

FIG. 13 is a schematic diagram of an eleventh embodiment of the present disclosure, and describes the following scenario:

A first node MN1 sends an Xn message HANDOVER REQUEST or an X2 message HANDOVER REQUEST to a second node MN2. The first node and the second node may be a gNB, an eNB or an ng-eNB.

Specifically, in step 1301, the first node MN1 sends a handover request signaling to the second node MN2, to notify the second node to prepare a handover process.

The signaling may include the following one or more pieces of information:
  UE history information, which may include the identifier information of an SN to which the UE ever connects, and/or the time length of the connection between the UE and the SN, and/or the reason for changing the SN, and
  SN information, the SN information including the identifier information the SN to which the UE ever connects, and/or the time length of the connection between the UE and the SN, and/or the reason for changing the SN.

The identifier information of the SN includes the PSCell ID of a cell of the SN belongs. Optionally, the identifier information of the SN may further include the node ID of the SN.

If the first node and the second node are gNBs, the signaling is an Xn signaling handover request message (HANDOVER REQUEST). If the first node and the second node are eNBs, the signaling is an X2 signaling handover request message (HANDOVER REQUEST).

FIG. 14 is a schematic diagram of a twelfth embodiment of the present disclosure, and describes the following scenario: a base station 1 initiates a handover process to a base station 2, and a radio link failure occurs on the base station 2 within a short time after the handover is successful. The UE reconnects to a base station 3 and then successfully switches to a base station 4. The UE sends a radio link failure report to the base station 4. The radio link failure report is finally forwarded to the base station 1 through an inter-base station signaling. In this embodiment, the base stations 1-4 are NG-RAN nodes 1-4, and the inter-base station signaling is an Xn signaling.

The UE sends the radio link failure report describing the radio link failure information to the NG-RAN node 4. There is an Xn connection between the NG-RAN node 4 and the NG-RAN node 2, and between the NG-RAN node 2 and the NG-RAN node 1. The NG-RAN node 1 and the NG-RAN node 3 are ng-eNBs, and the NG-RAN node 2 and the NG-RAN node 4 are gNBs; or the NG-RAN node 1 and the NG-RAN node 3 are gNBs, and the NG-RAN node 2 and the NG-RAN node 4 are ng-eNBs. Optionally, the UE reports a movement history information report, and the movement history information report includes the cell identifier information of a secondary cell group (SCG) cell to which the UE ever connects, and/or the time length of the connection between the UE and the cell.

In step 1401, the NG-RAN node 4 receives the radio link failure report sent by the UE, and learns that the radio link failure related to the radio link failure report occurs at the NG-RAN node 2 according to the information of a failed cell carried in the radio link failure report. The NG-RAN node 4 sends an Xn signaling failure indication to the NG-RAN node 2, to notify the NG-RAN node 2 that a radio link failure has occurred before. The signaling carries the radio link failure report describing the radio link failure information, and/or UE History Information, and/or the movement history information report reported by the UE. The UE History Information here may include the same information as that included in the UE history information in the foregoing embodiments.

If the NG-RAN node 1 and the NG-RAN node 3 are the ng-eNBs, and the NG-RAN node 2 and the NG-RAN node 4 are the gNBs, the radio link failure report is defined in the 3GPP specification TS38.331. If the NG-RAN node 1 and the NG-RAN node 3 are the gNBs, and the NG-RAN node 2 and the NG-RAN node 4 are the ng-NBs, the radio link failure report is defined in the 3GPP specification TS36.331.

In step 1402, according to source cell information carried in the received radio link failure report, the NG-RAN node 2 learns that the source base station of the handover process before the radio link failure occurs is the NG-RAN node 1. The NG-RAN node 2 may learn that the UE reconnects to the NG-RAN node 3 after the handover failure according to the received radio link failure report, the UE Historical Information, or the movement history information report reported by the UE. The NG-RAN node 2 determines the type of the radio link failure is a handover to a wrong node (HO to wrong cell) according to the above information. The NG-RAN node 2 sends an Xn signaling HANDOVER REPORT to the NG-RAN node 1. In addition to the failure type and the handover reason, the signaling may further carry the following one or more pieces of information:

Source cell information.
Failed cell information.
Radio link failure report.
UE history information.
Movement history information report reported by the UE.

The NG-RAN node 1 may use the received failure type as its own determination, or determine the failure type by itself according to the received information, for example, the source cell belongs to the NG-RAN node 1. The NG-RAN node 1 learns that the handover to the NG-RAN node 2 is successful but the radio link failure occurs soon according to the radio link failure report, and learns that the UE reconnects to the NG-RAN node 3 according to the UE Historical Information, or the movement history information report reported by the UE. Therefore, the NG-RAN node 1 may determine that the failure type is the handover to the wrong node (HO to wrong cell).

The NG-RAN node 1 may adjust the parameter configuration information corresponding to the initiation of the handover according to the above information, and optimize the mechanism of deciding to initiate the handover process.

If there is no Xn connection between the NG-RAN node 4 and the NG-RAN node 2, or between the NG-RAN node 2 and the NG-RAN node 1, the radio link failure report and the UE History Information and/or the movement history information report reported by the UE may be forwarded by the core network node, for example, transferred using an Ng signaling. The Ng signaling may be an uplink access network configuration transfer (UPLINK RAN CONFIGURATION TRANSFER) and/or a downlink access network configuration transfer (DOWNLINK RAN CONFIGURATION TRANSFER).

FIG. 15 is a simplified block diagram of an entity 1500 applicable to practice various exemplary embodiments of the present disclosure. The entity 1500 may be configured to be an MN, an SN or a UE.

As shown in FIG. 15, the entity 1500 includes a processor 1501, a memory 1502 coupled to the processor 1501, and a suitable transmitter and receiver 1504 coupled to the processor 1501. The memory 1502 stores a program 1503. The transmitter/receiver 1504 is suitable for a two-way wireless communication. It should be noted that the transmitter/receiver 1504 has at least one antenna for assisting communication. In practice, the entity 1500 may be coupled to one or more external networks or systems such as the Internet, via a data path. The program 1503 may include program instructions. The program instructions, when executed by the associated processor 1501, cause the entity 1500 to operate according to the respective exemplary embodiments of the present disclosure.

The embodiments of the present disclosure may be implemented by computer software, hardware, firmware or any appropriate combination thereof which may be executed by the processor 1501 of the entity 1500.

The memory 1502 may be any appropriate type of memory suitable for a local technical environment, and may be implemented using any appropriate data-storage technology, for example, a storage device and system based on a semiconductor, a magnetic storage device and system, an optical storage device and system, a fixed memory and a removable memory, which are only non-restrictive examples. Although only one memory is illustrated in the entity 1500, a plurality of physically independent storage units may be present in the entity 1500. The processor 1501 may be any appropriate type of processor suitable for the local technical environment, and may include one or more of: a general-purpose computer, a special-purpose computer, a microprocessor, a digital signal processor (DSP) and a processor based on a multi-core processor architecture, which are only non-restrictive examples.

It should be appreciated that, each unit included in the entity 1500 is configured to practice the exemplary embodiments disclosed herein. Therefore, the above operations and feathers described in combination with FIGS. 13 and 14 are also applicable to the entity 1500 and the units therein, and a detailed description thereof is omitted herein.

As another aspect, the present disclosure further provides a computer readable storage medium. The computer readable storage medium may be the computer readable storage medium included in the MN, the SN or the UE in the above embodiments, or a stand-alone computer readable storage medium not assembled into a device. The computer readable storage medium stores one or more programs. The one or more programs, when executed by one or more processors, perform the communication method described in the present disclosure.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

In an implementation, a method performed by a master node (MN) in a mobile communication network, comprising receiving, from a user equipment (UE), a first message including information reporting a failure of a secondary cell group (SCG) in case that a secondary node change from the source secondary node to a first target secondary node is failed and transmitting, to the source secondary node, a second message including information associated with a failure of the secondary node change, wherein the second message includes at least one of following information, an identifier of the first target secondary node where the failure of the secondary node change occurs, an identifier of the source secondary node to which the UE successfully connects before the failure of the secondary node change, and information on a type of the failure of the secondary node change.

In an implementation, further comprising, identifying a second target secondary node for the secondary node change and transmitting, to the second target secondary node, a third message including information requesting an establishment of a new connection to the second target secondary node after receiving the first message, wherein the second message further includes an identifier of a second target secondary node identified for the new connection after the failure of the secondary node change.

In an implementation further comprising, identifying whether the master node is a trigger node at which the secondary node change is decided in case that the trigger node is the master node, identifying the failure of the secondary node change based on the received first message, and determining the type of the failure of the secondary node change and in case that the trigger node is the source secondary node or else, receiving, from the source secondary node, the information on the type of the failure of the secondary node change.

In an implementation, the third message further includes history information of the UE, and wherein the history information includes an identifier information of one or more secondary nodes to which the UE ever connect, a time length of a connection between the UE and the one or more secondary nodes, and information representing a reason for the secondary node change.

In an implementation the first message includes in case that the failure of the secondary node change occurs in a short time after the secondary node change was successful, the first message includes identifier information of a cell to which the UE was successfully connected, and an identifier information of a cell which a secondary node, where the failure of the secondary node change occurs, belongs to, and a time length between a previous successful secondary node change and the failure of the secondary node change and in case that the failure of the secondary node change occurs in a process of the secondary node change, the first message includes the identifier information of the cell to which the UE was successfully connected, and the identifier information of the cell which the secondary node, where the failure of the secondary node change occurs, belongs to.

In an implementation the second message includes mobility information for the source secondary node, the mobility information being an identifier associated with a configuration parameter that is used to decide the secondary node change.

In an implementation, in case that the secondary node change from the source secondary node to the first target secondary node is successful, receiving from the UE, information reporting a successful SCG change.

In an another implementation a method performed by a source secondary node in a mobile communication network, comprising transmitting, to a master node, a first message for requesting a secondary node change for a user equipment (UE) and receiving, from the master node, a second message including information associated with a failure of the secondary node change in case that the secondary node change from the source secondary node to a first target secondary node is failed, wherein the second message includes at least one of following information, an identifier of the first target secondary node where the failure of the secondary node change occurs, an identifier of the source secondary node to which the UE successfully connects before the failure of the secondary node change, and information on a type of the failure of the secondary node change.

In an implementation further comprising in case that a trigger node, at which the secondary node change is decided, is the source secondary node, receiving from the master node, an information about the failure of the secondary node change, and determining a type of the failure of the secondary node change.

In an implementation the second message includes mobility information for the source secondary node, the mobility information being an identifier associated with a configuration parameter that is used to decide the secondary node change wherein the identifier generated by the secondary node change.

In an implementation master node (MN) in a mobile communication network, comprising a first transceiver, a second transceiver communicating with other node and a processor configured to receive, by the first transceiver from a user equipment (UE), a first message including information reporting a failure of a secondary cell group (SCG) in case that a secondary node change from the source secondary node to a first target secondary node is failed; and transmit, by the second transceiver to the source secondary node, a second message including information associated with a failure of the secondary node change, wherein the second message includes at least one of following information, an identifier of the first target secondary node where the failure of the secondary node change occurs, an identifier of the source secondary node to which the UE successfully connects before the failure of the secondary node change, and information on a type of the failure of the secondary node change.

In an implementation the processor further configured to identify a second target secondary node for the secondary node change and transmit, by the second transceiver, to the second target secondary node, a third message including information requesting an establishment of a new connection to the second target secondary node after receiving the first message, wherein the second message further includes an identifier of a second target secondary node identified for the new connection after the failure of the secondary node change.

In an implementation wherein the processor further configured to identify whether the master node is a trigger node at which the secondary node change is decided in case that the trigger node is the master node, identify the failure of the secondary node change based on the received first message, and determine the type of the failure of the secondary node change and in case that the trigger node is the source secondary node or else, receive, by the second transceiver from the source secondary node, the information on the type of the failure of the secondary node change.

In an implementation a source secondary node in a mobile communication network, comprising a first transceiver, a second transceiver communicating with other node, and a processor configured to request a master node to change a user equipment (UE) connecting from the source secondary node to a first target secondary node, receive, by the first transceiver from the master node, a third message about a secondary cell group (SCG) failure, wherein the third message includes at least one of following information, an identifier of the first target secondary node where a failure of a secondary cell group (SCG) occurs, an identifier of the source secondary node to which the UE successfully connects before the failure of the SCG, and an identifier of a second target secondary node reselected by the master node for the UE after the failure of the SCG.

In an implementation the processor further configured to in case that a trigger node, at which the secondary node change is decided, is the source secondary node, receive, by the first transceiver from the master node, an information about the failure of the secondary node change, and determine a type of the failure of the secondary node change.

The invention claimed is:

1. A method performed by a master node (MN) in a mobile communication network, comprising:
receiving, from a source secondary node, a first message to change a secondary node,
the first message including mobility information related on the changing of the secondary node;
receiving, from a user equipment (UE), a second message including information reporting a failure of a secondary cell group (SCG);

identifying the information on the failure of the SCG relating on the source secondary node; and
transmitting, to the source secondary node,
a third message including information associated with a failure of the secondary node change based on the identified information,
wherein the second message includes:
an identifier of a first target secondary node where the failure of the secondary node change occurs,
an identifier of the source secondary node to which the UE successfully connects before the failure of the secondary node change,
time information on the failure of the secondary node change, and
information on the failure of the secondary node change.

2. The method of claim 1, further comprising:
identifying a second target secondary node for the secondary node change; and
transmitting, to the second target secondary node, a third message including information requesting an establishment of a new connection to the second target secondary node after receiving the first message,
wherein the third message further includes an identifier of a second target secondary node identified for the new connection after the failure of the secondary node change.

3. The method of claim 1, wherein identifying the information on the failure of the SCG relating on the source secondary node comprises:
identifying that the failure of the secondary node change is triggered by the source secondary node based on the second message.

4. The method of claim 2, wherein the third message further includes:
an identifier of the first target secondary node where the failure of the secondary node change occurs,
an identifier of the source secondary node to which the UE successfully connects before the failure of the secondary node change, and
information on the second message.

5. The method of claim 1, wherein the third message includes:
mobility information for the source secondary node.

6. The method of claim 1, further comprising:
in case that the secondary node change from the source secondary node to the first target secondary node is successful,
receiving from the UE, information reporting a successful SCG change.

7. A method performed by a source secondary node in a mobile communication network, comprising:
transmitting, to a master node, a first message to change a secondary node for a user equipment (UE),
the first message including mobility information related on the changing of the secondary node; and
receiving, from the master node, a second message including information associated with a failure of the secondary node change,
wherein the second message includes:
an identifier of a first target secondary node where the failure of the secondary node change occurs,
an identifier of the source secondary node to which the UE successfully connects before the failure of the secondary node change, and information on a third message received by the master node from the UE, the third message including information on a failure of a secondary cell group (SCG) change.

8. The method of claim 7, further comprising:
and determining a type of the failure of the secondary node change.

9. The method of claim 7, wherein the third message includes:
an identifier of the first target secondary node where the failure of the secondary node change occurs,
an identifier of the source secondary node to which the UE successfully connects before the failure of the secondary node change,
time information on the failure of the secondary node change,
mobility information for the source secondary node, and
information on the failure of the secondary node change.

10. A master node (MN) in a mobile communication network, comprising:
a first transceiver;
a second transceiver communicating with other node; and
a processor configured to:
receive, by a second transceiver from a source secondary node, a first message to change a secondary node, the first message including mobility information related on the changing of the secondary node,
receive, by the first transceiver from a user equipment (UE), a second message including information on a failure of a secondary cell group (SCG);
identify the information on the failure of the SCG relating on the source secondary node, and
transmit, by the second transceiver, to the source secondary node, a third message including information associated with a failure of the changing of the secondary node based on the identified information,
wherein the second message includes:
an identifier of a first target secondary node where the failure of the secondary node change occurs,
an identifier of the source secondary node to which the UE successfully connects before the failure of the secondary node change,
time information on the failure of the secondary node change, and
information on the failure of the secondary node change.

11. The master node of claim 10, wherein the processor is further configured to:
identify a second target secondary node for the secondary node change; and
transmit, by the second transceiver, to the second target secondary node, a third message including information requesting an establishment of a new connection to the second target secondary node after receiving the first message,
wherein the third message further includes an identifier of a second target secondary node identified for the new connection after the failure of the secondary node change.

12. The master node of claim 10, wherein, to identify the information on the failure of the SCG relating on the source secondary node, the processor is further configured to:
identify that the failure of the secondary node change is triggered by the source secondary node based on the second message.

13. A source secondary node in a mobile communication network, comprising:

a first transceiver;
a second transceiver communicating with other node; and
a processor configured to:
    transmit, by the second transceiver, to a master node, a first message to change a secondary node for a user equipment (UE) the first message including mobility information related on the changing of the secondary node, and
    receive, by the first transceiver from the master node, a second message including information associated with a failure of the secondary node change,
wherein the second message includes:
    an identifier of a first target secondary node where the failure of the secondary node change occurs,
    an identifier of the source secondary node to which the UE successfully connects before the failure of the secondary node change, and
    information on a third message received by the master node from the UE, the third message including information on a failure of a secondary cell group (SCG) change.

14. The source secondary node of claim 13, wherein the processor is further configured to:
    determine a type of the failure of the secondary node change based on the second message.

\* \* \* \* \*